US012658337B2

(12) United States Patent
Lim et al.

(10) Patent No.: US 12,658,337 B2
(45) Date of Patent: Jun. 16, 2026

(54) DEVICE FOR CONTROLLING AN ION, METHOD FOR FORMING THE SAME, AND METHOD FOR CONTROLLING THE SAME

(71) Applicant: NANYANG TECHNOLOGICAL UNIVERSITY, Singapore (SG)

(72) Inventors: Yu Dian Lim, Singapore (SG); Peng Zhao, Singapore (SG); Chuan Seng Tan, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 359 days.

(21) Appl. No.: 18/292,712

(22) PCT Filed: Jul. 19, 2022

(86) PCT No.: PCT/SG2022/050507

§ 371 (c)(1),
(2) Date: Jan. 26, 2024

(87) PCT Pub. No.: WO2023/009067

PCT Pub. Date: Feb. 2, 2023

(65) Prior Publication Data

US 2024/0347224 A1 Oct. 17, 2024

(30) Foreign Application Priority Data

Jul. 30, 2021 (SG) ............................ 10202108328T

(51) Int. Cl.
*G21K 1/20* (2026.01)

(52) U.S. Cl.
CPC ...................................... *G21K 1/20* (2026.01)

(58) Field of Classification Search
USPC ........................................ 250/281, 282, 283
See application file for complete search history.

(56) References Cited

U.S. PATENT DOCUMENTS 8,395,112 B1 * 3/2013 Bier ........................ G01N 21/53 250/281
9,791,258 B2 10/2017 Mower et al.
(Continued)

FOREIGN PATENT DOCUMENTS

WO 2021006811 1/2021

OTHER PUBLICATIONS

Nitesh Chauhan et al: "Visible light photonic integrated Brillouin laser". Arxiv . Org, Cornell University Library, 201 Olin Library Cornell University Ithaca, NY 14853, Feb. 19, 2021, 23 pages.
(Continued)

*Primary Examiner* — Kiet T Nguyen
(74) *Attorney, Agent, or Firm* — Womble Bond Dickinson (US) LLP

(57) ABSTRACT

A device for controlling an ion, having an electrode arrangement configured to generate an electric field to trap the ion, wherein a plurality of openings are defined in the electrode arrangement, and an optical arrangement configured to transmit a plurality of output optical signals of different wavelengths to the trapped ion to control the trapped ion, wherein the optical arrangement includes a plurality of wavelength filters configured to receive at least one input optical signal, wherein, for each wavelength filter, the wavelength filter is configured to filter the at least one input optical signal to generate a respective output optical signal of the plurality of output optical signals, and wherein the optical arrangement is configured to transmit the respective output optical signal to the trapped ion through a respective opening of the plurality of openings, the respective output optical signal being defined by a respective wavelength of the different wavelengths.

17 Claims, 11 Drawing Sheets

(56) References Cited

U.S. PATENT DOCUMENTS

| | | | |
|---|---|---|---|
| 10,084,034 | B2 | 9/2018 | Youngner |
| 11,150,609 | B1 | 10/2021 | Parazzoli et al. |
| 2006/0169882 | A1 | 8/2006 | Pau et al. |
| 2010/0187402 | A1 | 7/2010 | Hochberg et al. |
| 2021/0151613 | A1 | 5/2021 | Yang et al. |

OTHER PUBLICATIONS

Extended European Search Report mailed Jun. 3, 2025, for corresponding European Application No. 22849997.6 (5 pages).

Niffenegger R. J. et al., "Integrated multi-wavelength control of an ion qubit". Nature, Oct. 21, 2020, vol. 586, No. 7830, pp. 538-542.

Karan K. Mehta, "Integrated optical quantum manipulation and measurement of trapped ions," Dec. 31, 2017.

Day M. L. et al., A micro-optical module for multi-wavelength addressing of trapped ions. Quantum Science and Technology, Feb. 24, 2021, vol. 6, No. 2, pp. 024007.

* cited by examiner

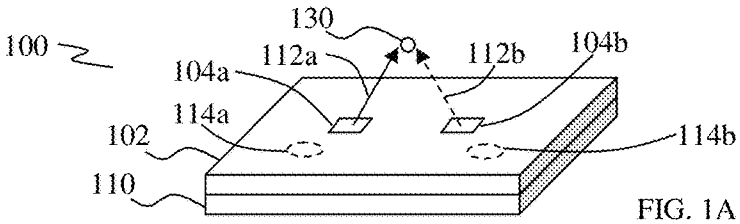

FIG. 1A

150

- Form an electrode arrangement configured to generate an electric field to trap the ion, wherein a plurality of openings are defined in the electrode arrangement — 152
- Form an optical arrangement configured to transmit a plurality of output optical signals of different wavelengths to the trapped ion to control the trapped ion — 154
- Form a plurality of wavelength filters configured to receive at least one input optical signal, wherein, for each wavelength filter of the plurality of wavelength filters, the wavelength filter is configured to filter the at least one input optical signal to generate a respective output optical signal of the plurality of output optical signals, and wherein the optical arrangement is configured to transmit the respective output optical signal to the trapped ion through a respective opening of the plurality of openings, the respective output optical signal being defined by a respective wavelength of the different wavelengths — 154a

FIG. 1B

160

- Generate, by means of an electrode arrangement of the device, an electric field to trap the ion — 162
- Filter, by means of an optical arrangement of the device, at least one input optical signal to generate a plurality of output optical signals of different wavelengths — 164
- Transmit, by means of the optical arrangement, the plurality of output optical signals to the trapped ion to control the trapped ion, wherein a respective output optical signal of the plurality of output optical signals having a respective wavelength of the different wavelengths is transmitted to the trapped ion through a respective opening of a plurality of openings defined in the electrode arrangement — 166

FIG. 1C

DEVICE FOR CONTROLLING AN ION, METHOD FOR FORMING THE SAME, AND METHOD FOR CONTROLLING THE SAME

CROSS-REFERENCE TO RELATED APPLICATIONS

This application is a national stage filing under 35 U.S.C. 371 of PCT/SG2022/050507, filed Jul. 19, 2022, which International Application was published by the International Bureau in English on Feb. 2, 2023, as WO 2023/009067, and application claims the benefit of priority of Singapore patent application Ser. No. 10202108328T, filed Jul. 30, 2021, which applications are hereby incorporated by reference in their entirety in this application.

TECHNICAL FIELD

Various embodiments relate to a device for controlling an ion, a method for forming a device for controlling an ion, and a method for controlling a device for controlling an ion.

BACKGROUND

Over the past decade, there has been much attention in the field of quantum computing. Utilising the quantum-mechanical phenomenon of quantum bits (qubits), various major players in technologies, including Google Inc., Honeywell, and IBM, have made tremendous developments in the development and commercialisation of quantum computers. In the context of ion trap quantum computers, IonQ, a spin-off from University of Maryland specialising in ion trap quantum computers, is going public through a merger with a pro-forma market capitalisation of $2 billion. However, much efforts are still needed in the miniaturisation of ion trap via CMOS (complementary metal-oxide semiconductor) fabrication techniques, and photonics integration with the CMOS-fabricated on-chip ion trap.

SUMMARY

The invention is defined in the independent claims. Further embodiments of the invention are defined in the dependent claims.

According to an embodiment, a device for controlling an ion is provided. The device may include an electrode arrangement configured to generate an electric field to trap the ion, wherein a plurality of openings are defined in the electrode arrangement, and an optical arrangement configured to transmit a plurality of output optical signals of different wavelengths to the trapped ion to control the trapped ion, wherein the optical arrangement includes a plurality of wavelength filters configured to receive at least one input optical signal, wherein, for each wavelength filter of the plurality of wavelength filters, the wavelength filter is configured to filter the at least one input optical signal to generate a respective output optical signal of the plurality of output optical signals, and wherein the optical arrangement is configured to transmit the respective output optical signal to the trapped ion through a respective opening of the plurality of openings, the respective output optical signal being defined by a respective wavelength of the different wavelengths.

According to an embodiment, a method for forming a device for controlling an ion is provided. The method may include forming an electrode arrangement configured to generate an electric field to trap the ion, wherein a plurality of openings are defined in the electrode arrangement, and forming an optical arrangement configured to transmit a plurality of output optical signals of different wavelengths to the trapped ion to control the trapped ion, wherein forming the optical arrangement includes forming a plurality of wavelength filters configured to receive at least one input optical signal, wherein, for each wavelength filter of the plurality of wavelength filters, the wavelength filter is configured to filter the at least one input optical signal to generate a respective output optical signal of the plurality of output optical signals, and wherein the optical arrangement is configured to transmit the respective output optical signal to the trapped ion through a respective opening of the plurality of openings, the respective output optical signal being defined by a respective wavelength of the different wavelengths.

According to an embodiment, a method for controlling a device for controlling an ion is provided. The method may include generating, by means of an electrode arrangement of the device, an electric field to trap the ion, filtering, by means of an optical arrangement of the device, at least one input optical signal to generate a plurality of output optical signals of different wavelengths, and transmitting, by means of the optical arrangement, the plurality of output optical signals to the trapped ion to control the trapped ion, wherein a respective output optical signal of the plurality of output optical signals having a respective wavelength of the different wavelengths is transmitted to the trapped ion through a respective opening of a plurality of openings defined in the electrode arrangement.

BRIEF DESCRIPTION OF THE DRAWINGS

In the drawings, like reference characters generally refer to like parts throughout the different views. The drawings are not necessarily to scale, emphasis instead generally being placed upon illustrating the principles of the invention. In the following description, various embodiments of the invention are described with reference to the following drawings, in which:

FIG. 1A shows a schematic perspective view of a device for controlling an ion, according to various embodiments.

FIG. 1B shows a flow chart illustrating a method for forming a device for controlling an ion, according to various embodiments.

FIG. 1C shows a flow chart illustrating a method for controlling a device for controlling an ion, according to various embodiments.

DETAILED DESCRIPTION

Figure 2A:
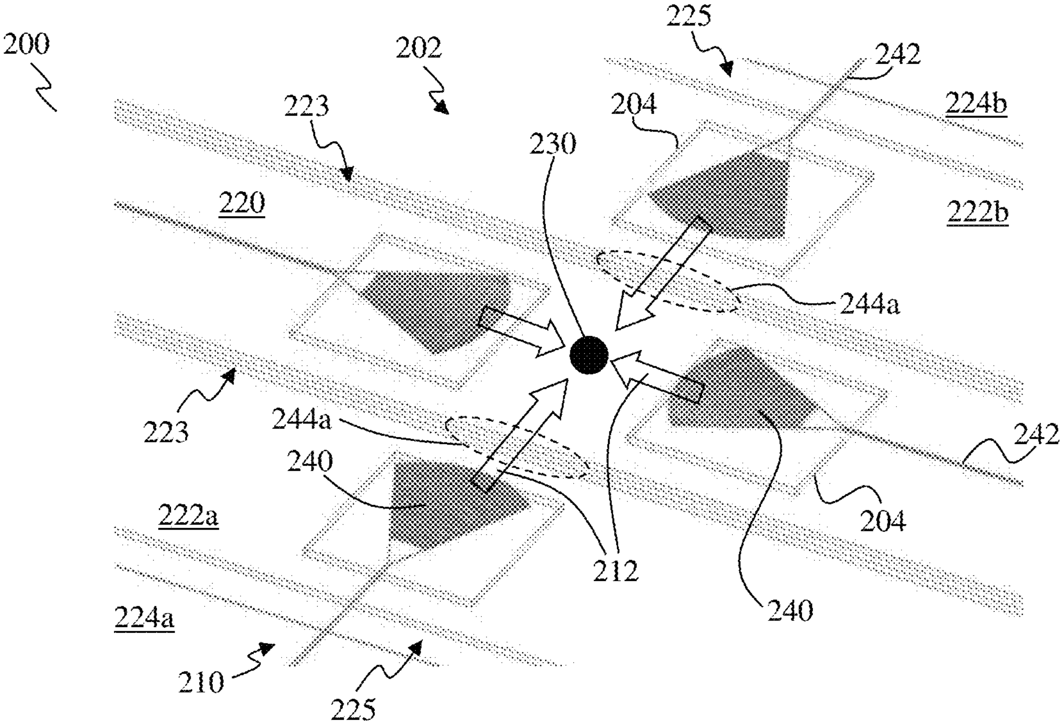
FIGS. 2A and 2B show schematic partial perspective views of a device for controlling an ion, according to various embodiments.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Embodiments described in the context of one of the methods or devices are analogously valid for the other methods or devices. Similarly, embodiments described in the context of a method are analogously valid for a device, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles “a”, “an” and “the” as used with regard to a feature or element include a reference to one or more of the features or elements.

In the context of various embodiments, the phrase “at least substantially” may include “exactly” and a reasonable variance.

As used herein, the term “and/or” includes any and all combinations of one or more of the associated listed items.

As used herein, the phrase of the form of “at least one of A or B” may include A or B or both A and B. Correspondingly, the phrase of the form of “at least one of A or B or C”, or including further listed items, may include any and all combinations of one or more of the associated listed items.

Various embodiments may relate to a wavelength filtering and photon detection methodology by photonics circuits with multi-layer ring resonator filtering and inter-electrode detector placement. The term “multi-layer” here refers to the use of multiple ring resonators for wavelength filtering.

Various embodiments may provide an ion trap design with electrode openings (e.g., opening windows) for optical addressing. For example, one or more ions may be trapped and, depending on the operation required, light may be transmitted or directed to the desired ion associated with the operation to optically address the desired ion.

Various embodiments may provide a photonics circuit to be integrated into a planar electrode ion trap. The on-chip integration may be carried out using known CMOS fabrication technique(s). The photonics circuit may include a multi-layer wavelength filtering device and a series of photon detectors. The term “multi-layer” described herein refers to having or the use of a plurality of wavelength filters, e.g., a plurality of ring resonators. The wavelength filtering system may utilise two or more wavelength filters or ring resonator devices to selectively channel the desired wavelengths into the corresponding grating couplers for the optical addressing of one or more trapped ions. At the same time, one or more photon detectors may be placed strategically between the electrodes of the ion trap to enable detection of photons emitted from the trapped ion(s).

Various embodiments may relate to quantum computers, for example, ion trap quantum computers. Ion trap quantum computers use trapped ions as qubits in performing computing operations. Laser beams of specified wavelengths may be required to shine onto the trapped ions to perform optical addressing for quantum computing operation. Various embodiments include the integration of grating couplers on-chip to achieve optical addressing, where the laser light is coupled out from a respective grating, reaching the trapped ion via the associated opening window on the ion trap electrodes. On top of that, photon detectors may be provided to detect photons emitted from the trapped ion during quantum computing operations. For quantum computing operations, laser beams with narrow bandwidth may often be needed, where wavelength filters are usually attached externally to the laser source in known approaches. At the same time, in known approaches, the photon detectors are often externally-attached. The externally-attached wavelength filters and photon detectors limit the miniaturisation of quantum computing devices. In view of the problems associated with known approaches, various embodiments may include one or more of the following designs:

1. On-chip multi-layer wavelength filtering using two or more ring resonator structures. For the purpose of wavelength filtering as described herein, at least two ring resonators may be employed to separate out a mixture of multiple (e.g., at least two) wavelengths using the ring resonators.
2. Positioning of photon detectors at the gaps between ion trap electrodes for photon detection.

Various embodiments may include integrated ring resonators for wavelength filtering and/or specific placement of photon detectors (e.g., avalanche photodiode (APD) or single-photon avalanche diode (SPAD)) for the detection of photons emitted from trapped ion(s).

Various embodiments may integrate photonics component (s) with ion trap on the same chip. This may enable multi-ion optical addressing to be carried out in a miniaturised, scalable, manner.

Various embodiments may provide an ion trap or a device for trapping ion with a plurality of planar electrodes. Various embodiments may allow for large scale integration with the inclusion of photonics interposer for optical addressing of ion qubits, where a single light source may be employed for multiple ion qubits.

In various embodiments, the openings for optical addressing may be designed on the ground electrode, where there may be less disruption on RF (radio frequency) propagation. Additionally or alternatively, openings for optical addressing may be designed on one or more RF electrodes. At the same time, oxide etching may be introduced in the opening (s) to form a trench which may help to suppress stray fringe E-field. This may effectively reduce the charge accumulation around the opening(s), which may enhance the ion trapping capability of the ion trap.

Various embodiments may provide a parallel arrangement of ion qubit(s). Such an arrangement, however, may be less compacted as compared to a rectangular, spatial arrangement.

FIG. 1A shows a schematic perspective view of a device 100 for controlling an ion 130, according to various embodiments. The device 100 includes an electrode arrangement 102 configured to generate an electric field to trap the ion 130, wherein a plurality of openings 104*a*, 104*b* are defined in the electrode arrangement 102, and an optical arrangement 110 configured to transmit a plurality of output optical signals (represented by arrows 112*a*, 112*b*) of different wavelengths to the trapped ion 130 to control the trapped ion 130, wherein the optical arrangement 110 includes a plurality of wavelength filters (represented by dashed ovals 114*a*, 114*b*) configured to receive at least one input optical signal, wherein, for each wavelength filter 114*a*, 114*b* of the plurality of wavelength filters 114*a*, 114*b*, the wavelength filter 114*a*, 114*b* is configured to filter the at least one input optical signal to generate a respective output optical signal 112*a*, 112*b* of the plurality of output optical signals 112*a*, 112*b*, and wherein the optical arrangement 110 is configured to transmit the respective output optical signal 112*a*, 112*b* to the trapped ion 130 through a respective opening 104*a*, 104*b* of the plurality of openings 104*a*, 104*b*, the respective output optical signal 112*a*, 112*b* being defined by a respective wavelength of the different wavelengths.

In other words, a device 100 for controlling an ion 130 (e.g., trapping the ion 130, optically addressing the ion 130, etc.) may be provided. The device 100 may include an electrode arrangement 102 that may generate an electric field to trap (or confine or capture) the ion 130. The electrode arrangement 102 may be or may act as an ion trap. The electric field may generate a minimal pseudopotential point (or minimum electric field point) where the ion 130 may be trapped. The ion 130 may be trapped above or over the electrode arrangement 102. A plurality of openings 104*a*, 104*b* may be defined in (or through) the electrode arrangement 102. The plurality of openings 104*a*, 104*b* may include openings (e.g., in the form of opening windows) 104*a*, 104*b* defined in or through one or more electrodes of the electrode arrangement 102.

The device 100 may further include an optical arrangement 110 that may transmit (or shine) a plurality of output optical signals (or lights) 112*a*, 112*b* of different wavelengths (i.e., a plurality of wavelengths, each wavelength being different from the other wavelengths), e.g., 21, 22, etc., to the trapped ion 130 to control (e.g., manipulate or (optically) address) the trapped ion 130. In various embodiments, the plurality of output optical signals 112*a*, 112*b* of the different wavelengths may be used to perform optical addressing of the trapped ion 130, for example, for quantum computing operation.

The optical arrangement 110 may include a plurality of wavelength filters (or filtering elements) 114*a*, 114*b* configured to receive at least one input optical signal. For each wavelength filter 114*a*, 114*b* of the plurality of wavelength filters 114*a*, 114*b*, the wavelength filter 114*a*, 114*b* may be configured to filter the at least one input optical signal to generate a respective output optical signal (or respective filtered optical signal) 112*a*, 112*b* of the plurality of output optical signals (or plurality of beams) 112*a*, 112*b*, and wherein the optical arrangement 110 may be configured to transmit the respective output optical signal (or respective light) 112*a*, 112*b* to the trapped ion 130 through a respective opening 104*a*, 104*b* of the plurality of openings 104*a*, 104*b*, the respective output optical signal 112*a*, 112*b* being defined by (or having) a respective wavelength of the different wavelengths. This may mean that each wavelength filter 114*a*, 114*b* may selectively filter the at least one input optical signal and channel the desired (respective) wavelength to (wards) the trapped ion 130 for controlling or optically addressing the trapped ion 130. A respective output optical signal 112*a*, 112*b* may be coupled out of or from a respective wavelength filter 114*a*, 114*b*. A respective output optical signal 112*a*, 112*b* of a respective wavelength may be used to perform a respective control or manipulation of the trapped ion 130. Accordingly, as described above, a respective wavelength filter 114*a*, 114*b* filters the at least one input optical signal for a respective output optical signal 112*a*, 112*b* of a respective wavelength to be optically coupled out of the respective wavelength filter 114*a*, 114*b* to (wards) the trapped ion 130 via a respective opening 104*a*, 104*b*.

Fiber-to-chip coupling can be bulky in terms of chip packaging. At the same time, the fiber-to-chip alignment can be complex too. By employing wavelength filtering according to various embodiments, the number of fiber-to-chip couplings may be reduced, for example, from four to two, which may help to reduce the complexity and the required chip space.

As described above, the device 100 may include an optical arrangement 110, and an ion trap, in the form of the electrode arrangement 102.

In the context of various embodiments, the term "light" may include not only an optical signal in the visible light range but also an optical signal in the infrared range or in the ultraviolet range.

The electrode arrangement 102 may be or may include a planar electrode arrangement.

The electrode arrangement 102 may include a plurality of electrodes, e.g., a plurality of ion trap electrodes. The plurality of (ion trap) electrodes may be spaced apart from each other. For example, adjacent two (ion trap) electrodes may be spaced apart from each other by a (inter-electrode) gap.

The optical arrangement 110 may include a plurality of optical elements or structures, including the plurality of wavelength filters 114*a*, 114*b*. The optical arrangement 110 may be a photonics interposer or a photonics circuit.

The optical arrangement 110 may be integrated with the electrode arrangement 102. This may mean that the optical arrangement 110 and the electrode arrangement 102 are provided on the same chip. The device 100 may be a photonics-integrated planar electrode ion trap.

The optical arrangement 110 may be arranged below or underneath or buried beneath the electrode arrangement 102. The electrode arrangement 102 and the optical arrangement 110 may be supported or arranged on a support structure or substrate. The support structure may include a silicon-based substrate or a glass substrate. The support structure may include a silicon-on-insulator (SOI) structure.

The at least one input optical signal includes a plurality of wavelengths. The at least one input optical signal may include a single input optical signal or a plurality of input optical signals. The single input optical signal or each input optical signal includes a plurality of wavelengths.

The at least one input optical signal may be provided by an optical source or light source, e.g., a laser source. The at least one input optical signal may be provided by or from a single source.

The plurality of output optical signals (or plurality of beams) 112*a*, 112*b* of the different wavelengths may be transmitted at different times at or to the same trapped ion 130 to perform different controls or optical addressing of the same ion 130 at different times.

In the context of various embodiments, each opening 104*a*, 104*b* may have a size or area of at least 5×5 μm$^2$, for example, at least 10×10 μm$^2$, or at least 20×20 μm$^2$. As non-limiting examples, each opening 104*a*, 104*b* may have a size or area of 5×5 $\mu m^2$, 10×10 $\mu m^2$, 20×20 $\mu m^2$, 30×30 $\mu m^2$, 40×40 $\mu m^2$, or 50×50 $\mu m^2$.

In the context of various embodiments, each opening 104*a*, 104*b* may be of any suitable shape. As non-limiting examples, each opening 104*a*, 104*b* may be a square, a rectangle, a circle or any polygonal shape.

In the context of various embodiments, the electrode arrangement 102 may include or may be made of copper (Cu). The electrode arrangement may further include gold (Au) over Cu. It should be appreciated that other suitable conductive materials or metals may be used, either individually or in combination with another conductive material or metal, for example, in a layered arrangement.

In the context of various embodiments, the optical arrangement 110 may include a silicon-based material.

While two openings 104*a*, 104*b* are shown in FIG. 1A, it should be appreciated that there may be two, three, four or any higher number of openings 104*a*, 104*b* defined in the electrode arrangement 102.

While two wavelength filters 114*a*, 114*b* are shown in FIG. 1A, it should be appreciated that there may be two, three, four or any higher number of wavelength filters 114*a*, 114*b* provided with the optical arrangement 110. As a non-limiting example, four to five wavelength filters 114*a*, 114*b* may be provided.

In various embodiments, a plurality of ions may be trapped by means of the electrode arrangement 102. The plurality of ions may be arranged linearly, for example, along the ground electrode to be described below. Individual ions may be controlled or optically addressed, for example, at different times.

The device 100 may further include an insulating layer (e.g., oxide layer, e.g., $SiO_2$ layer) in between the electrode arrangement 102 and the optical arrangement 110. A trench may be defined through the insulating layer at each opening 104*a*, 104*b* of the plurality of openings 104*a*, 104*b*. Each trench may be defined through the entire depth of the insulating layer. Each trench may be of a depth of at least 6 μm. The trenches may be formed by dry etching the insulating layer.

Etching of the underlying insulator layer (e.g., oxide layer) may be introduced in the openings to form respective trenches which may help to suppress stray fringe E-field. This may effectively reduce the charge accumulation around the openings, which may enhance the ion trapping capability of the ion trap. Stray field has been found to be reduced significantly when the (oxide) etch or cut is 6 μm and above.

In various embodiments, the (or each) wavelength filter 114*a*, 114*b* may include or may be a ring resonator device (or ring resonator structure or arrangement). Accordingly, a plurality of ring resonator devices may be provided. A respective output optical signal 112*a*, 112*b* of a respective wavelength may be coupled out of or from a respective ring resonator device. The respective wavelength of the respective output optical signal 112*a*, 112*b* generated/outputted by the corresponding ring resonator device is dependent on the resonant wavelength of the corresponding ring resonator device. Each ring resonator device may have a shape in the form of a circle or an oval. Each ring resonator device may have any possible radius that may be dependent on the wavelength of the output optical signal 112*a*, 112*b* to be optically coupled out of the corresponding ring resonator device. The radius of the respective ring resonator device may be defined or adjusted to selectively filter the at least one input optical signal for the respective output optical signal 112*a*, 112*b* of the desired (respective) wavelength to be optically coupled out of the respective ring resonator device. In the context of various embodiments, each ring resonator device may include or may be an asymmetrical ring resonator.

It should be appreciated that other types of wavelength filters 114*a*, 114*b* may be employed, for example, in the form of an active Mach-Zehnder interferometer (MZI) with an optical modulator for each wavelength filter 114*a*, 114*b*. However, ring resonator devices are preferred as they yield a sharp peak on the desired wavelength (see, for example, FIGS. 5B and 5D to be discussed further below) and filter away the neighbouring wavelengths compared to an active Mach-Zehnder interferometer (with an optical modulator) that may reduce the power of a specific wavelength.

The optical arrangement 110 may further include at least one photon detector configured to detect one or more photons emitted from (or by) the trapped ion 130 in response to the trapped ion 130 receiving the respective output optical signal 112*a*, 112*b*, the at least one photon detector being arranged optically exposed through an aperture defined in the electrode arrangement 102. Photons may be emitted in an isotropic direction, e.g., in a sphere shape. By being optically exposed through the aperture, the at least one photon detector is capable of receiving and detecting the photons through the aperture.

A plurality of photon detectors (e.g., two photon detectors) may be provided as part of the optical arrangement 110. However, it should be appreciated that any higher number of photon detectors may be provided. The at least one photon detector or each photon detector may be or may include an avalanche photodiode (APD) or single-photon avalanche diode (SPAD). A plurality of apertures may be defined in the electrode arrangement 102, wherein a respective photon detector of the plurality of photon detectors may be optically exposed through a respective aperture of the plurality of apertures.

Detection of the emitted photon(s) may serve one or more of the following reasons:

(i) To identify the presence of ion(s). When there is no trapped ion, there is no photon emission, and, thus, the detector(s) can only read or detect noises. When an ion 130 has been successfully trapped, and in response to the trapped ion 130 receiving an output optical signal 112*a*, 112*b*, the ion 130 emits photons that may be detected by the photon detector(s).

(ii) To serve as readout/feedback when the ion 130 is switched from the ground state to the excited state (e.g., <0> state to <1> state during quantum computing operation), and vice versa.

In various embodiments, the electrode arrangement 102 may include a ground electrode (e.g., GND electrode) configured to be connected to ground, a pair of first electrodes (e.g., RF electrodes) configured to generate a radio frequency (RF) field, and at least one pair of second electrodes (e.g., DC electrodes) configured to generate a direct current (DC) (or static) field, where the RF field and the DC field may define the electric field. In other words, the electric field may include the RF field and the DC field. The RF field and the DC field may co-operatively act to trap the ion 130. The RF field and the DC field may co-operatively generate a minimal pseudopotential point (or minimum electric field point) where the ion 130 may be trapped. The GND electrode may act as ground to the pair of RF electrodes and the at least one pair of DC electrodes. The ground electrode, the pair of first electrodes and the at least one pair of second electrodes may define a plurality of ion trap electrodes.

The pair of first electrodes or RF electrodes may be connected to at least one RF source. This may mean that an RF potential or RF signal may be applied to the pair of RF electrodes.

The at least one pair of second electrodes or DC electrodes may be connected to at least one DC source. At least one electrical (or DC) signal or potential may be applied to the at least one pair of DC electrodes. In various embodiments, the electrode arrangement 102 may include a plurality of pairs of second or DC electrodes configured to generate the DC field. A respective electrical signal may be applied to a respective pair of DC electrodes.

The GND electrode, the pair of RF electrodes and the at least one pair of DC electrodes may be planar electrodes. The GND electrode, the pair of RF electrodes and the at least one pair of DC electrodes may be arranged co-planar to each other.

The GND electrode and the pair of RF electrodes may be arranged at least substantially parallel to each other. This may mean that the respective longitudinal axes of the GND electrode and the pair of RF electrodes may be at least substantially parallel to each other. The GND electrode may be sandwiched between the pair of RF electrodes. The GND electrode may be arranged centrally in the electrode arrangement 102. The GND electrode and the pair of RF electrodes may be sandwiched between the at least one pair of DC electrodes.

In various embodiments, (at least some of) the plurality of openings (e.g., in the form of opening windows) 104*a*, 104*b* may be defined in (or through) at least one of the ground electrode or the pair of first electrodes. In other words, the plurality of openings may be defined by a plurality of opening windows formed in (or through) at least one of the ground electrode or the pair of first electrodes. As a non-limiting example, the ground electrode may have the plurality of openings defined therein (or therethrough) and/or one or more electrodes of the pair of first electrodes may have the plurality of openings defined therein (or therethrough). Additionally or alternatively, the ground electrode, the pair of first electrodes and the at least one pair of second electrodes may be spaced apart from each other by a plurality of gaps (or inter-electrode gaps), and (at least some other of) the plurality of openings 104*a*, 104*b* may be defined by the plurality of gaps.

In various embodiments, the aperture through which the at least one photon detector may be optically exposed may be defined in or through one of the GND electrode, the pair of RF electrodes or the pair of DC electrodes, e.g., in the form of an additional opening window. The aperture may be defined by a gap between adjacent two electrodes selected from the GND electrode, the pair of RF electrodes and the pair of DC electrodes, e.g., the inter-electrode gap between the GND electrode and an electrode of the pair of RF electrodes. The at least one photon detector may be placed anywhere along the gap. In various embodiments with a plurality of apertures, the apertures may be defined in at least one of the GND electrode, the pair of RF electrodes or the pair of DC electrodes, and/or may be defined by inter-electrode gaps.

In various embodiments, adjacent electrodes of the GND electrode, the pair of RF electrodes and the at least one pair of DC electrodes may be spaced apart from each other and trenches may also be defined through the insulating layer in the spacing or gap between the adjacent electrodes. The trench in each gap may be defined through the entire depth of the insulating layer. The trenches may be formed by dry etching the insulating layer.

The optical arrangement 110 may further include a plurality of optical output couplers (configured to transmit the plurality of output optical signals 112*a*, 112*b*), wherein, for each optical output coupler of the plurality of optical output couplers, the optical output coupler may be optically coupled to a respective (or corresponding) wavelength filter 114*a*, 114*b* of the plurality of wavelength filters 114*a*, 114*b* to transmit the respective output optical signal (defined by the respective wavelength) 112*a*, 112*b* to the trapped ion 130 through the respective opening 104*a*, 104*b*. In other words, a respective output optical signal 112*a*, 112*b* may be coupled out of or from a respective optical output coupler to the trapped ion 130. A respective optical output coupler may be arranged optically exposed through a respective opening 104*a*, 104*b*. Being optically exposed means that the respective output optical signal 112*a*, 112*b* from the respective optical output coupler may be transmitted through the respective opening 104*a*, 104*b*, either directly or through an intermediate layer. The intermediate layer may be optically transparent.

At least one of the size, shape, position, or number of optical output couplers may be varied. Generally, each optical output coupler may be designed specifically for one wavelength only. Thus, the number of optical output couplers may be dependent on the number of lights or number of wavelengths to be transmitted to the ion 130. The number of wavelength filters 114*a*, 114*b* may be dependent on the number of optical output couplers as each wavelength filter 114*a*, 114*b* is associated with a respective optical output coupler.

One or more of the plurality of optical output couplers, or each optical output coupler, may include an output grating. In other words, each optical output coupler may be an output grating coupler. The output grating may include or may be defined by a series of curved lines.

As described above, a respective wavelength filter 114*a*, 114*b* is configured to filter the at least one input optical signal for a respective output optical signal 112*a*, 112*b* of a respective wavelength to be optically coupled out of the respective wavelength filter 114*a*, 114*b* to (wards) a respective optical output coupler for the respective optical output coupler to transmit the respective output optical signal 112*a*, 112*b* through a respective opening 104*a*, 104*b*, to (wards) the trapped ion 130.

In various embodiments, the plurality of optical output couplers may include a first pair of optical output couplers arranged along a first axis, and a second pair of optical output couplers arranged along a second axis. The first axis and the second axis are different from each other. The first axis and the second axis may be at least substantially orthogonal to each other.

The optical output couplers of the first pair may be arranged facing each other. The optical output couplers of the first pair may be arranged spaced apart from each other. The optical output couplers of the first pair may be arranged to be on opposite sides of an ion 130 that is to be trapped.

The optical output couplers of the second pair may be arranged facing each other. The optical output couplers of the second pair may be arranged spaced apart from each other. The optical output couplers of the second pair may be arranged to be on opposite sides of an ion 130 that is to be trapped.

The optical arrangement 110 may further include at least one input waveguide optically coupled to the plurality of wavelength filters 114*a*, 114*b*. The at least one input waveguide may allow the at least one input optical signal (e.g., light) from one or more optical sources or light sources to propagate within and/or through the at least one input waveguide towards or to the plurality of wavelength filters 114*a*, 114*b*. The at least one input waveguide or part(s) thereof may be included or comprised in the plurality of wavelength filters 114*a*, 114*b*.

The optical arrangement 110 may further include a plurality of coupling waveguides, wherein, for a respective coupling waveguide of the plurality of coupling waveguides, the coupling waveguide may be optically coupled to a respective wavelength filter 114*a*, 114*b* and a respective optical output coupler (to allow the respective output optical signal to propagate from the respective wavelength filter 114*a*, 114*b* to the respective optical output coupler). The respective coupling waveguide or part thereof may be part of or comprised in the respective wavelength filter 114*a*, 114*b*.

FIG. 1B shows a flow chart 150 illustrating a method for forming a device for controlling an ion, according to various embodiments.

At 152, an electrode arrangement configured to generate an electric field to trap the ion is formed, wherein a plurality of openings are defined in the electrode arrangement.

At 154, an optical arrangement configured to transmit a plurality of output optical signals of different wavelengths to the trapped ion to control the trapped ion is formed.

For or as part of forming the optical arrangement, at 154*a*, a plurality of wavelength filters configured to receive at least one input optical signal is formed, wherein, for each wavelength filter of the plurality of wavelength filters, the wavelength filter is configured to filter the at least one input optical signal to generate a respective output optical signal of the plurality of output optical signals, and wherein the optical arrangement is configured to transmit the respective output optical signal to the trapped ion through a respective opening of the plurality of openings, the respective output optical signal being defined by a respective wavelength of the different wavelengths.

In various embodiments, at 154*a*, a plurality of ring resonator devices may be formed. This may mean that the (each) wavelength filter may include or may be a ring resonator device.

At 154, at least one photon detector configured to detect one or more photons emitted from the trapped ion in response to the trapped ion receiving the respective output optical signal may further be formed, the at least one photon detector being arranged optically exposed through an aperture defined in the electrode arrangement.

At 152, a ground electrode configured to be connected to ground may be formed, a pair of first electrodes configured to generate a radio frequency (RF) field may be formed, and at least one pair of second electrodes configured to generate a direct current (DC) field may be formed. The RF field and the DC field may define the electric field.

In various embodiments, (at least some of) the plurality of openings may be defined in at least one of the ground electrode or the pair of first electrodes, e.g., in the form of opening windows.

In various embodiments, the ground electrode, the pair of first electrodes and the at least one pair of second electrodes may be spaced apart from each other by a plurality of gaps, and (at least some other of) the plurality of openings may be defined by the plurality of gaps.

At 154, a plurality of optical output couplers may further be formed, wherein, for each optical output coupler of the plurality of optical output couplers, the optical output coupler may be optically coupled to a respective wavelength filter of the plurality of wavelength filters to transmit the respective output optical signal to the trapped ion through the respective opening.

For or as part of forming the plurality of optical output couplers, a first pair of optical output couplers may be formed along a first axis, and a second pair of optical output couplers may be formed along a second axis.

FIG. 1C shows a flow chart 160 illustrating a method for controlling a device for controlling an ion, according to various embodiments.

At 162, an electric field to trap the ion may be generated by means of an electrode arrangement of the device.

At 164, at least one input optical signal may be filtered by means of an optical arrangement of the device to generate a plurality of output optical signals of different wavelengths. The at least one input optical signal may be filtered by means of a plurality of wavelength filters of the optical arrangement.

At 166, the plurality of output optical signals may be transmitted by means of the optical arrangement to the trapped ion to control the trapped ion, wherein a respective output optical signal of the plurality of output optical signals having a respective wavelength of the different wavelengths is transmitted to the trapped ion through a respective opening of a plurality of openings defined in the electrode arrangement.

While the methods described above is illustrated and described as a series of steps or events, it will be appreciated that any ordering of such steps or events are not to be interpreted in a limiting sense. For example, some steps may occur in different orders and/or concurrently with other steps or events apart from those illustrated and/or described herein. In addition, not all illustrated steps may be required to implement one or more aspects or embodiments described herein. Also, one or more of the steps depicted herein may be carried out in one or more separate acts and/or phases.

It should be appreciated that description in the context of the device 100 may correspondingly be applicable in relation to the method for forming a device for controlling an ion described in the context of the flow chart 150 and the method for controlling a device for controlling an ion described in the context of the flow chart 160.

Various embodiments will now be further described by way of the following non-limiting examples with reference to FIGS. 2A to 8.

Figure 2B:
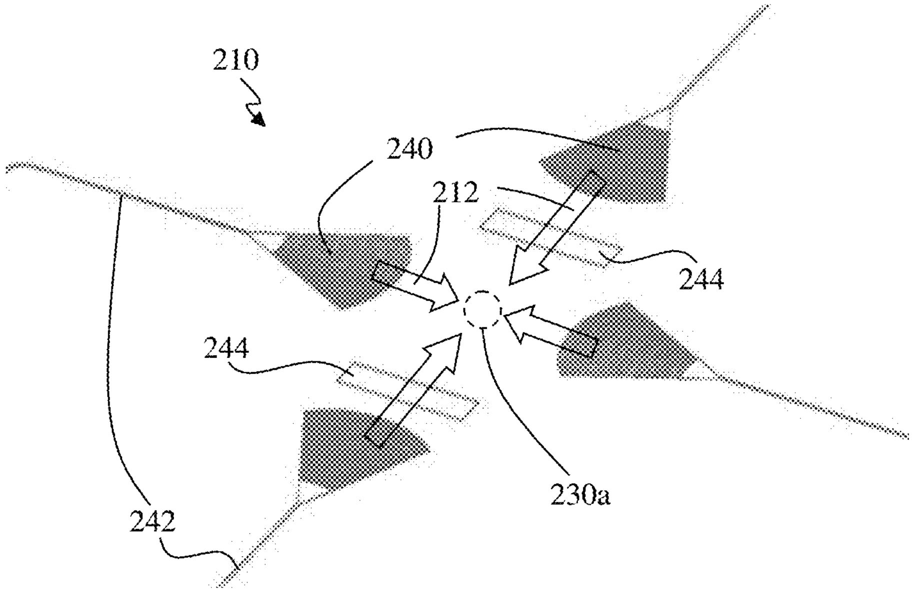

FIGS. 2A and 2B show schematic partial perspective views of a device 200 for controlling an ion, illustrating a photonics-integrated planar electrode ion trap 200. The device 200 includes an electrode arrangement 202, and an optical arrangement 210 that is arranged beneath the electrode arrangement 202. The ion trap device 200 may be silicon-based. The electrode arrangement 202 may generate an electric field to trap an ion 230 located above the electrode arrangement 202. The optical arrangement 210 may receive an input optical signal (or light or laser beam), and, based on the input optical signal, generate a plurality of output optical signals (or lights or laser beams) (represented by open arrows 212) to be transmitted to the ion 230.

The electrode arrangement 202 may include a plurality of ion trap electrodes, including a ground electrode (GND electrode) 220, a pair of RF electrodes 222*a*, 222*b* sandwiching the GND electrode 220, and DC electrodes 224*a*, 224*b* on the outer sides of the RF electrodes 222*a*, 222*b*. There are inter-electrode gaps 223 between the GND electrode 220 and the RF electrodes 222*a*, 222*b*, and inter-electrode gaps 225 between the RF electrodes 222*a*, 222*b* and the DC electrodes 224*a*, 224*b*. It should be appreciated that other suitable arrangements may be employed for the GND electrode 220, RF electrodes 222*a*, 222*b* and DC electrodes 224*a*, 224*b* relative to each other.

A plurality of openings, in the form of opening windows (represented by 204 for two such opening windows), may be defined in the electrode arrangement 202. As a non-limiting example, two opening windows 204 may be defined in or through between the GND electrode 220 and two opening windows 204 may be defined in or through the RF electrodes 222*a*, 222*b*. The opening windows 204 may be constructed on the ion trap electrodes to facilitate propagation of laser beams towards the trapped ion 230.

Each opening window 204 may have a size or area of at least 5×5 $\mu m^2$, for example, at least 10×10 $\mu m^2$, or at least 20×20 $\mu m^2$. As non-limiting examples, each opening window 204 may have a size or area of 5×5 $\mu m^2$, 10×10 $\mu m^2$, 20×20 $\mu m^2$, 30×30 $\mu m^2$, 40×40 $\mu m^2$, or 50×50 $\mu m^2$. Each opening window 204 may be of any suitable shape, for example, including but not limited to a square, a rectangle, a circle or any polygonal shape.

The optical arrangement 210 may include a plurality of photonics devices beneath the electrode arrangement 202 (or ion trap electrodes). Referring to FIGS. 2A and 2B, the optical arrangement 210 may include a plurality of optical output couplers (or grating couplers) 240 that may be optically exposed through the opening windows 204. A respective optical output coupler 240 may be optically exposed through a respective opening window 204 to allow a respective output optical signal (or light) 212 to be coupled out of the respective optical output coupler 240, through the opening window 204, and be transmitted above the electrode arrangement 202. In this way, grating couplers 240 may couple laser beams towards the trapped ion 230 for optical addressing (the location of the ion is represented by the dashed circle 230*a* in FIG. 2B). Each optical output coupler 240 may include or may have a series of curved lines defining a grating.

The grating couplers 240 couple respective lights towards the trapped ion 230 at different instances, depending on the applications. A single coupler 240 for coupling out or transmitting light of one wavelength is sufficient to optically address one ion 230 at any one time. In various embodiments, for most trapped ions, 4-5 different wavelengths may be required, which, therefore, correspond to 4-5 separate grating couplers 240 for optically addressing the ion 230 at different times.

In various embodiments, a trench (not shown) may be defined in or for each opening window 204, through the underlying insulator layer (e.g., an oxide layer, e.g., $SiO_2$ layer) (not shown) arranged underneath the electrode arrangement 202 and in between the electrode arrangement 202 and the optical arrangement 210. Each grating coupler 240 may be (optically) exposed through a respective trench. Dry etching may be carried out to etch the insulator layer to form the trenches.

The optical arrangement 210 may further include a plurality of coupling waveguides 242, where a respective coupling waveguide 242 may be associated with or optically coupled to a respective optical output coupler 240. A respective output optical signal 212 may propagate through a respective coupling waveguide 242 to be received by the respective optical output coupler 240, where the respective output optical signal 212 may be subsequently coupled out of or transmitted by the respective optical output coupler 240 to the trapped ion 230.

The optical arrangement 210 may further include two photon detectors 244 to detect one or more photons that are emitted by the trapped ion 230 in response to the ion 230 receiving an output optical signal 212. The photon detectors 244 may be positioned at the gaps between the ion trap electrodes for detection of photons emitted from the trapped ion 230, for example, at the gaps 223 between the GND electrode 220 and the RF electrodes 222*a*, 222*b*. The dashed ovals 244*a* in FIG. 2A show the locations the photon detectors 244 may be positioned underneath the electrode arrangement 202. It should be appreciated that the photon detectors 244 may, additionally or alternatively, be arranged to be optically exposed through apertures (not shown) defined in or through the GND electrode 220 and/or the RF electrodes 222*a*, 222*b*, e.g., in the form of additional opening windows.

While not shown, it should be appreciated that a plurality of ions may be trapped by the electrode arrangement 202. At any one time, a single ion may be optically addressed.

FIGS. 3A to 3D show schematic perspective views of a device design, illustrating an ion trap/photonics-integrated design. An overall construction of the device 300 of various embodiments is shown.

Figure 3A:
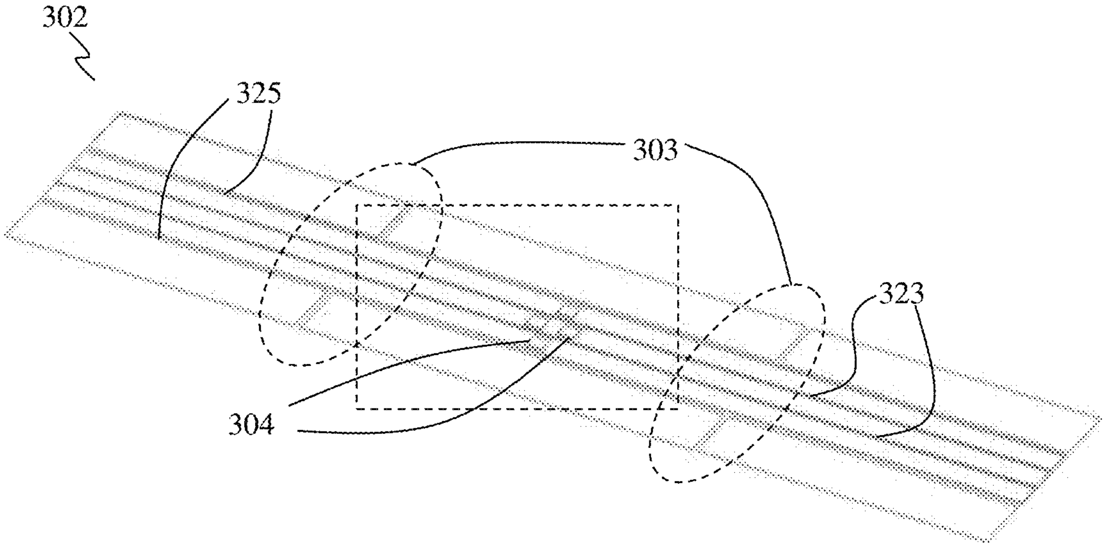
FIGS. 3A to 3D show schematic perspective views of a device design, according to various embodiments.

FIG. 3A shows a schematic perspective view of an electrode arrangement having ion trap electrodes (represented by dashed ovals 303) for the device 300. A plurality of openings (e.g., in the form of four opening windows 304) may be defined in the ion trap electrodes 303. The ion trap electrodes 303 are spaced apart from one another, with gaps 323, 325 between adjacent ion trap electrodes 303.

Figure 3B:
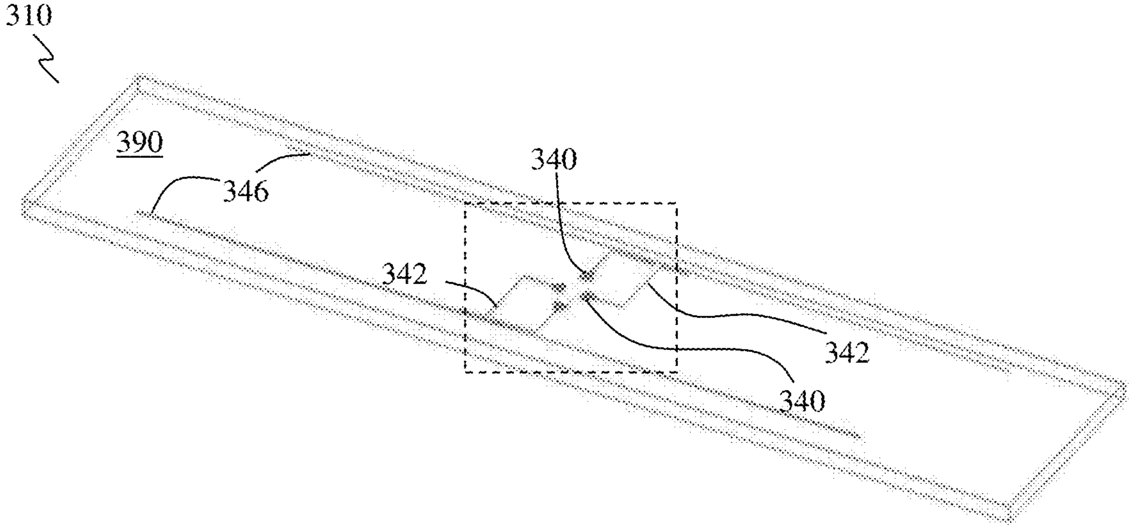

FIG. 3B shows a schematic perspective view of an optical arrangement 310 having photonics components (or photonics structures) that are arranged buried beneath the ion trap electrodes 303. The optical arrangement 310 may be formed on a support structure or substrate 390. The optical arrangement 310 may include a plurality of optical output couplers (or grating couplers) 340 (e.g., four optical output couplers 340). The optical arrangement 310 may further include a plurality of coupling waveguides 342 (e.g., four coupling waveguides 342) optically coupled to the optical output couplers 340, and further optically coupled to two input waveguides 346. The two input waveguides 346 may receive and propagate input optical signals (or lights or laser beams). It should be appreciated that the optical arrangement 310 may include photon detectors, which can be more clearly seen in FIG. 3D.

Figure 3C:
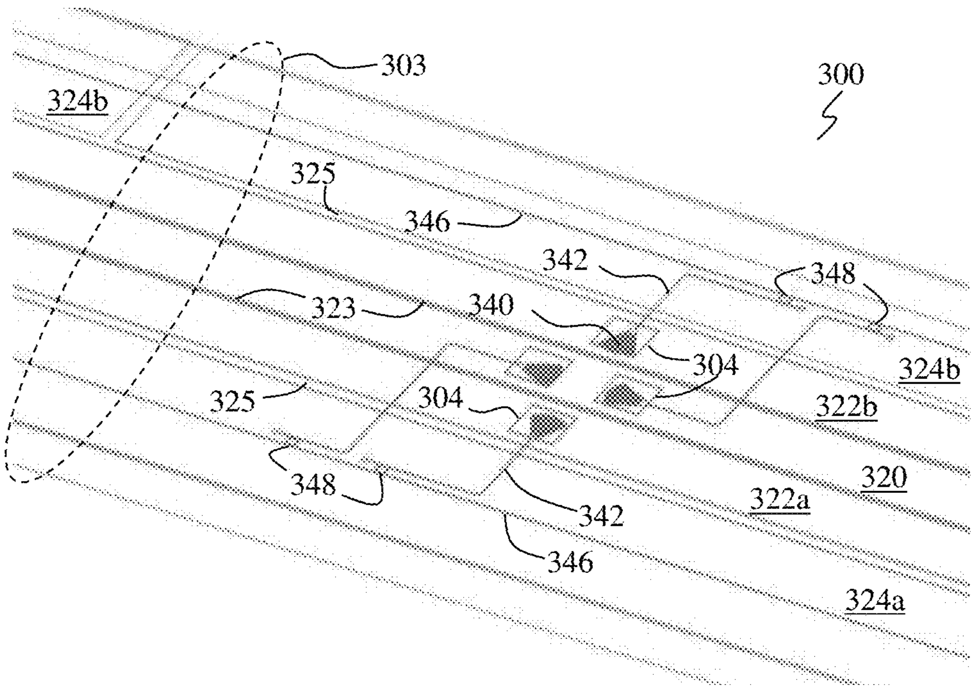

The design of the ion trap electrodes 303 is shown in FIG. 3C, which is a schematic view of a part of the device 300 at the dashed rectangle illustrated in FIG. 3A. For better understanding of the ion controlling device 300, part of the optical arrangement 310 is also shown in FIG. 3C to illustrate the positioning of the ion trap electrodes 303 and the opening windows 304 relative to the photonics components of the optical arrangement 310. The material of the electrodes 303 may include one or more conductive metals (e.g., gold, copper, etc.). The ion trap electrodes 303 may include a GND electrode 320 to be connected to a ground source, RF electrodes 322*a*, 322*b* to receive radio frequency (RF) signals, and DC electrodes 324*a*, 324*b* to receive direct current (DC) signals.

Figure 3D:
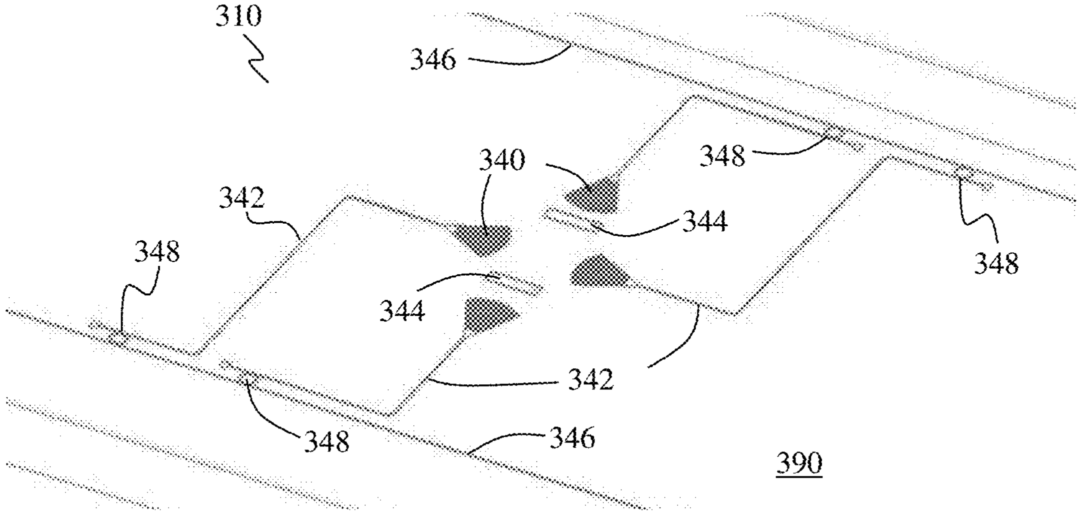

The design of the optical arrangement 310 is shown in FIG. 3D, which is a schematic view of a part of the optical arrangement 310 at the dashed rectangle illustrated in FIG. 3B. The photonics components of the optical arrangement 310 are integrated with the ion trap electrodes 303, and located beneath the ion trap electrode layer. Referring to FIGS. 3C and 3D, the photonics components include optical output couplers 340, coupling waveguides 342, photon detectors 344, input waveguides 346, wavelength filters (in the form of ring resonator devices 348). The ring resonator devices 348 may be optically coupled to the coupling waveguides 342 and the input waveguides 346.

As shown in FIG. 3C, the ion trap electrodes 303 may be constructed with opening windows 304 for grating couplers 340. Opening windows 304 may be constructed on the surfaces of the GND 320 and RF 322*a*, 322*b* electrodes to facilitate optical addressing of a trapped ion (not shown) using the grating couplers 340.

The input waveguides 346 may transfer laser beams of specified wavelengths from a laser source to(wards) the grating couplers 340. The grating couplers 340 may couple out the laser beams, where the beams then propagate towards the trapped ion for optical addressing. Laser beams with several wavelengths may propagate in a single waveguide 346. Therefore, ring resonators 348 may be used to act as wavelength filters to send desired, narrow bandwidth laser beams onto the corresponding grating couplers 340 for optical addressing. The photon detectors 344 may be used to detect photons emitted from the trapped ion, upon being optically addressed (or "shined") by the laser beams coupled out from the grating couplers 340. Each photon detector 344 may be either an avalanche photodiode (APD) or a single-photon avalanche diode (SPAD).

It should be appreciated that description in the context of the device 200 of FIG. 2A, including the electrode arrangement 202 and the optical arrangement 210, may be applicable to the device 300 (including the electrode arrangement 302 and the optical arrangement 310), and vice versa.

Figure 4A:
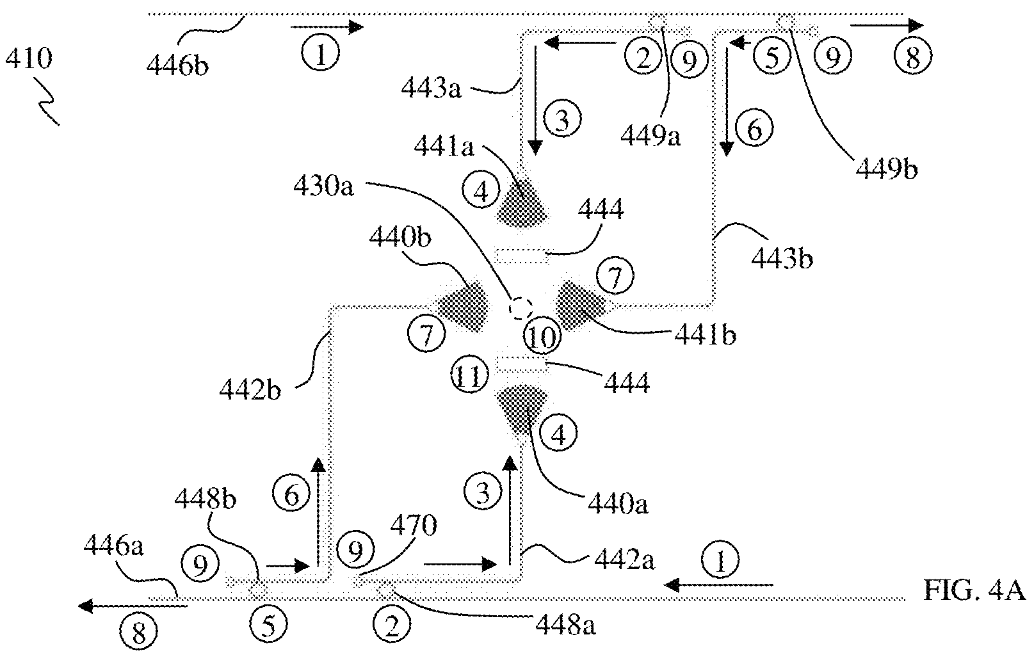
FIGS. 4A and 4B show schematic plan views of an optical arrangement of various embodiments.
Figure 4B:
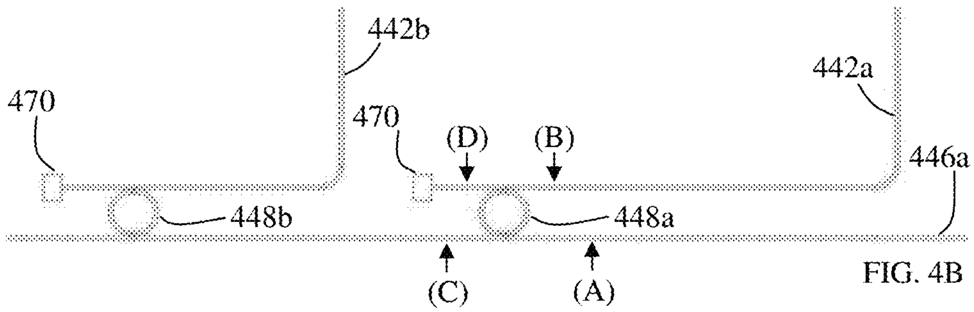

FIG. 4A shows a plan view of a photonics circuit 410 that is arranged beneath ion trap electrodes (not shown, but please refer to FIGS. 2A and 3C as examples), according to various embodiments. The photonics circuit 410 may include four optical output couplers 440*a*, 440*b*, 441*a*, 441*b*, four coupling waveguides 442*a*, 442*b*, 443*a*, 443*b*, two photon detectors 444, two input waveguides 446*a*, 446*b*, and four ring resonator devices 448*a*, 448*b*, 449*a*, 449*b*. The location of an ion to be trapped and optically addressed is represented by the dashed circle 430*a* in FIG. 4A. FIG. 4B shows a magnified plan view of a region of the photonics circuit 410 having an arrangement of the ring resonators 448*a*, 448*b*. Using the ring resonator device 448*a* as a non-limiting example, each ring resonator device is associated with 4 ports, illustrated as port (A), port (B), port (C), and port (D) in FIG. 4B.

Referring to FIG. 4A, at ①, wide spectrum of laser beams are inserted or propagated into the input waveguides 446*a*, 446*b*. As a non-limiting example, a $^{88}Sr^{+}$ ion (e.g., located at 430*a* above the ion trap electrodes) is used as the targeted ion species. $^{88}Sr^{+}$ ion may require laser beams of 405, 422, 674, 1033, 1092 nm wavelengths to perform complete quantum computing operations. As a non-limiting example using $^{88}Sr^{+}$ ions as qubits for quantum computing, light of 405 nm wavelength may be employed for ionisation of Sr, light of 422 nm wavelength may be employed for readout and detection of ion, light of 674 nm wavelength may be employed for clock transition (<0> state to <1> state), light of 1033 nm wavelength may be employed for clear out of energy level (to transition from <1> state to <0> state, and light of 1092 nm wavelength may be employed for repumping of ion so that the valence electron will not or may not fall into the forbidden energy level.

As a non-limiting example, two wavelengths that are close to each other, 1033 nm and 1092 nm, may be selected to pass into the same waveguide, go through the ring resonators to filter out two wavelengths into two separated grating couplers. This may mean that only one input coupling from fiber to chip may be required so as to reduce the number of coupling port and feature size of the device. For illustration and understanding purposes, and referring to FIG. 4A, lights of wavelengths of 1033 nm and 1092 nm may be provided to the input waveguides 446*a*, 446*b* to be filtered out using the ring resonators 448*a*, 448*b*, 449*a*, 449*b* and then channeled to the respective grating couplers 440*a*, 440*b*, 441*a*, 441*b*. After ①, the ring resonators 448*a*, 449*a* filter out the 1092 nm light at ② and channel the 1092 nm light to the respective coupling waveguides 442*a*, 443*a* at ③. The 1092 nm light beams are then coupled out from the grating couplers 440*a*, 441*a* at ④ to reach the trapped ion positioned at 430*a* (see ⑩) for optical addressing. Therefore, the ring resonators 448*a*, 449*a* for operation ② may be designed in such a way that the intensity of the 1092 nm light channelled to the coupling waveguides 442*a*, 443*a* at ③ may be at least substantially maximum or optimum, whereas the intensity of the 1033 nm light channelled to the same coupling waveguides 442*a*, 443*a* may be at least substantially minimum. By adjusting the radius of the ring resonator (to be described in greater detail below with reference to FIG. 4C), this may be achieved as shown in FIGS. 5A and 5B.

Figure 5A:
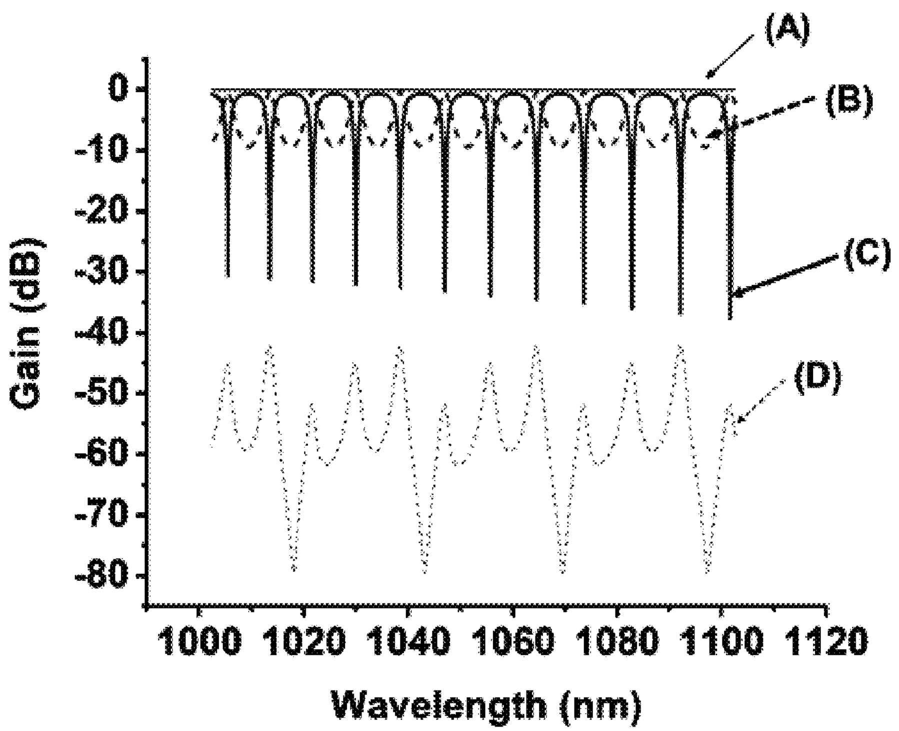
FIGS. 5A and 5B show the simulated ring resonator (20 μm/10 μm waveguide lengths, 10 μm optical path difference, maximum 1092 nm and minimum 1033 nm) performance.
Figure 5B:
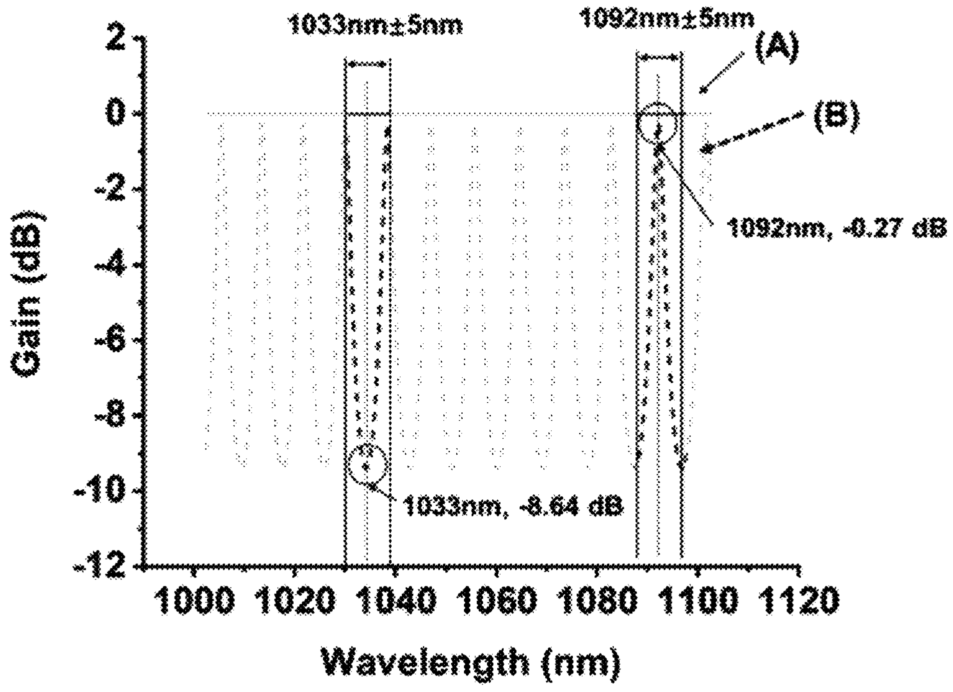

FIGS. 5A and 5B show the simulated ring resonator (20 μm/10 μm waveguide lengths, 10 μm optical path difference, maximum 1092 nm and minimum 1033 nm) performance. FIG. 5A shows the simulated optical gain at ports (A), (B), (C) and (D) illustrated in FIG. 4B. From the simulation, 0 dB of laser light ranging from 1000 nm to 1100 nm is inputted into port (A). The ring resonators 448*a*, 449*a* at ② channel approximately −0.27 dB 1092 nm light to port (B), reaching the grating couplers 440*a*, 441*a* at ④ for optical addressing, while −8.64 dB 1033 nm light is channelled into port (B). As may be observed in FIG. 5B, the optical gain of the 1033 nm light (−8.64 dB) is much lower than that for the 1092 nm light (−0.27 dB) at port (B). At the same time, −0.74 dB of 1033 nm light and −21.02 dB of 1092 nm light are channelled into port (C) and proceed to operation ⑤. Relatively low optical gain of −40 to −80 dB may be obtained at port (D), where a stopper 470 may be introduced (see ⑨) to prevent or at least minimise undesired reflection. The outcomes from FIGS. 5A and 5B may be obtained with a ring resonator optical path difference of 10 μm (e.g., (20-10) μm waveguides).

Figure 4C:
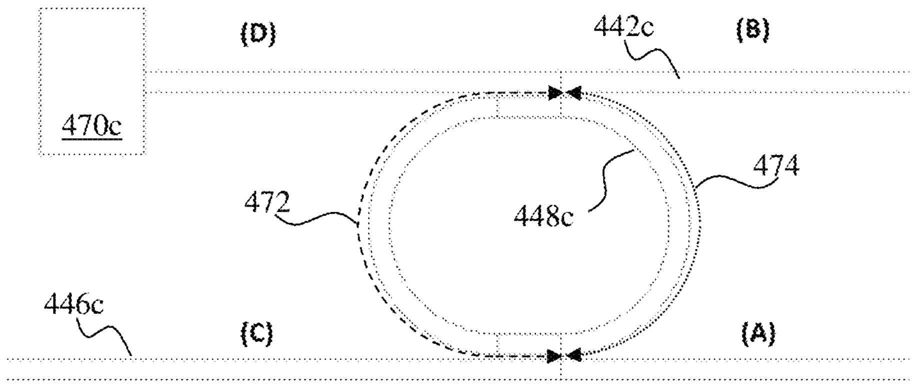
FIG. 4C shows a schematic view of a ring resonator device of various embodiments.

FIG. 4C shows a schematic view of a ring resonator device 448*c* that may be used in the device of various embodiments. The ring resonator device 448*c* is an asymmetrical ring resonator. The ring resonator device 448*c* is optically coupled to an input waveguide 446*c* and a coupling waveguide 442*c*. A stopper 470*c* may be provided at one end of the coupling waveguide 442*c*. The ring resonator device 448*c* may be defined by two optical path lengths, with a first optical path length being represented by the double-headed dashed curved arrow 472, and a second optical path length being represented by the double-headed dotted curved arrow 474. The optical path difference of the ring resonator 448*c* is defined by the difference between the first optical path length 472 and the second optical path length 474. For the results shown in FIGS. 5A and 5B, the ring resonators 448*a*, 449*a* having an optical path difference of 10 μm may be designed with a first optical path length 472 (see FIG. 4C) of 20 μm and a second optical path length 474 (see FIG. 4C) of 10 μm.

Figure 5C:
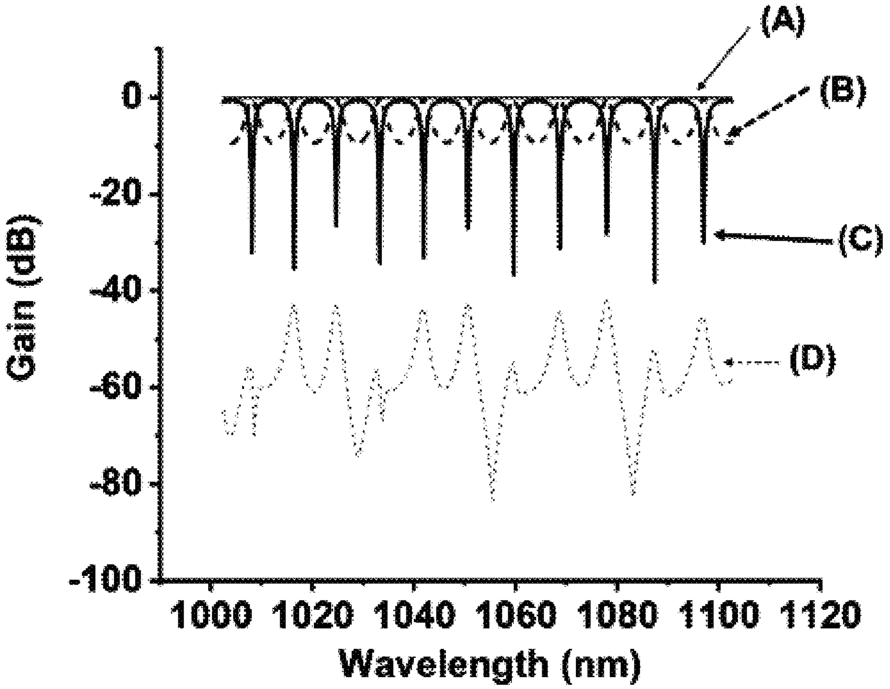
FIGS. 5C and 5D show the simulated ring resonator (19.45 μm/10 μm waveguide lengths, 9.45 μm optical path difference, maximum 1033 nm and minimum 1092 nm) performance.
Figure 5D:
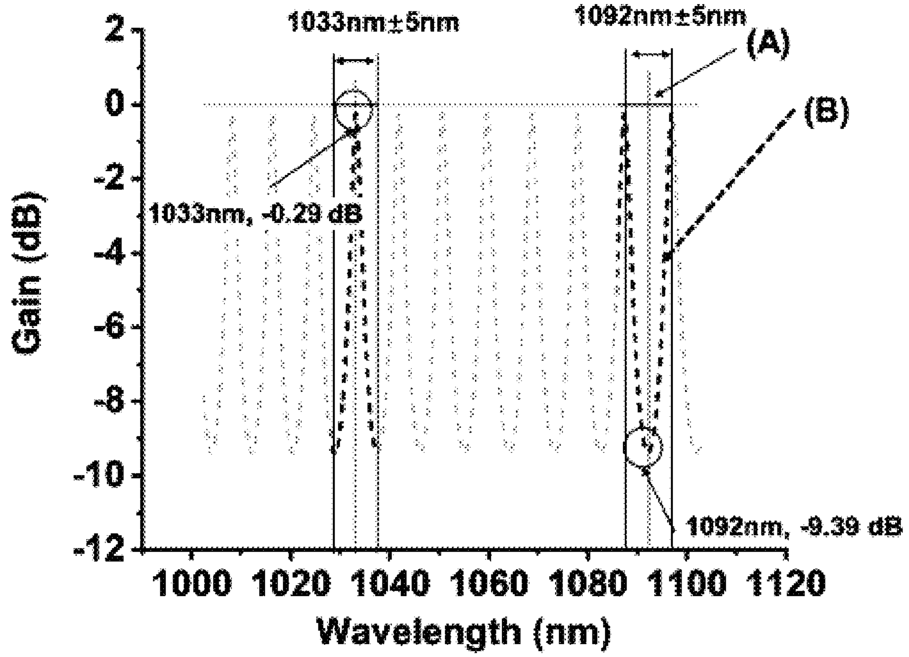

Referring back to FIG. 4A, at ⑤, a second-step filtering may occur where high(er) intensity 1033 nm light and low(er) intensity 1092 nm light may be channelled by the ring resonators 448*b*, 449*b* to the coupling waveguides 442*b*, 443*b* at ⑥, reaching the grating couplers 440*b*, 441*b* at ⑦ for the optical addressing of the trapped ion positioned at 430*a* (see ⑩). The remaining 1092 nm light and 1033 nm light may be channelled to or through the input waveguides 446*a*, 446*b* at ⑧. By changing the optical path difference of the ring resonator devices 448*b*, 449*b* to 9.45 μm (e.g., (19.45-10) μm waveguides), the simulated optical gain obtained is as shown in FIGS. 5C and 5D. Referring to FIG. 4C, the ring resonators 448*b*, 449*b* having an optical path difference of 9.45 μm may be designed with a first optical path length 472 of 19.45 μm and a second optical path length 474 of 10 μm.

If should be appreciated that the ring resonator device 448*c* of FIG. 4C may be designed with suitable first optical path length and second optical path length for filtering of different wavelengths.

FIGS. 5C and 5D show the simulated ring resonator (19.45 μm/10 μm waveguide lengths, 9.45 μm optical path difference, maximum 1033 nm and minimum 1092 nm) performance. FIG. 5C shows the simulated optical gain at ports (A), (B), (C) and (D) illustrated in FIG. 4B. As may be observed at FIG. 5D, the optical gain of the 1033 nm light (−0.42 dB) is much higher than that for the 1092 nm light (−9.39 dB) at port (B).

Referring back to FIG. 4A, the remaining lights may be channelled either to one or more neighbouring ion trap architectures, or stopped (as illustrated at operation ⑨), or to other miscellaneous photonics components as illustrated at operation ⑧.

In the presence of laser beams of multiple wavelengths (e.g., 405, 422, 1033 and 1092 nm), the trapped $^{88}Sr^+$ ion(s) emit photons which may be detected by the photon detectors 444 (see ⑩). When laser light, e.g., of 422 nm wavelength, is emitted onto a $^{88}Sr^+$ ion, the valence electron shifts to an excited state and drops back to the ground state, which then emits single photon. When laser light is continuously emitted towards the ion, the ion continuously emits light. The photon detectors 444 may be strategically placed between the gaps of the ion trap electrodes to capture or detect the photons.

The optical filtering abilities of the designed ring resonators 448*a*, 448*b*, 449*a*, 449*b* may be summarised in TABLE 1 below. Combining both designs (10 μm and 9.45 μm optical path differences) of the ring resonators 448*a*, 448*b*, 449*a*, 449*b*, wavelength filtering may be realised between 1092 and 1033 nm laser beams. However, it should be appreciated that the dual-filter design of various embodiments is not limited to 1033 and 1092 nm laser beams. The design of the ring resonators 448*a*, 448*b*, 449*a*, 449*b*, for example in terms of the optical path difference, may be changed to adapt to various required wavelengths. By combining several or different ring resonator designs, it is possible to perform wavelength filtering for various trapped ion species.

TABLE 1

Optical gain at Port (A), (B), and (C) for different ring resonators

| Ring Resonator Type | Port (A), Input | Port (B), Output to Grating Coupler | Port (C), Output to next Ring Resonator |
|---|---|---|---|
| Ring Resonator 1 (e.g., 448a, 449a), 10 μm optical path difference | 1033 nm, 0 dB, 1092 nm, 0 dB | 1033 nm, −8.54 dB, 1092 nm, −0.27 dB | 1033 nm, −0.76 dB, 1092 nm, −21.02 dB |
| Ring Resonator 2 (e.g., 448b, 449b), 9.45 μm optical path difference | 1033 nm, 0 dB, 1092 nm, 0 dB | 1033 nm, −0.42 dB, 1092 nm, −9.39 dB | 1033 nm, −13.97 dB, 1092 nm, −0.65 dB |

It should be appreciated that each of the ring resonator devices 448*a*, 448*b*, 449*a*, 449*b* may be designed to filter and channel respective different waveguides such that lights of four different wavelengths may be provided to the trapped ion by the respective ring resonator devices 448*a*, 448*b*, 449*a*, 449*b*. In this way, in various embodiments, a ring resonator denoted as $RR_n$, may couple out light of a wavelength, $\lambda_n$, where n=1, 2, 3, 4, 5, . . . m.

Figure 6A:
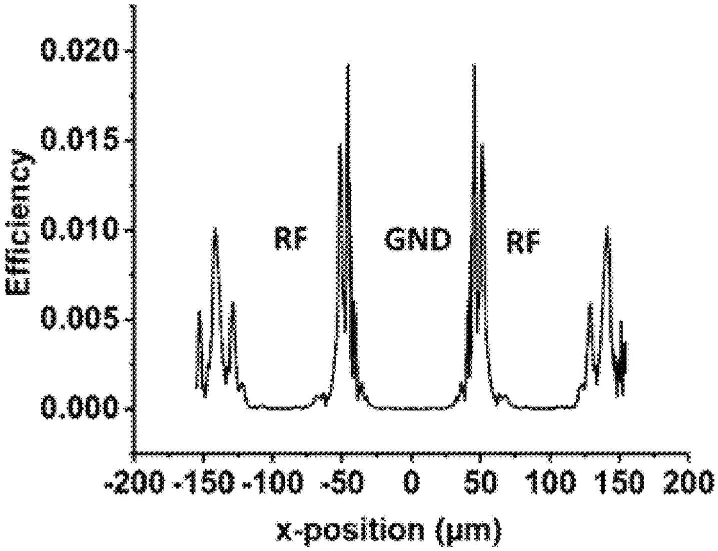
FIGS. 6A and 6B show results for energy efficiency distribution on the ion trap of various embodiments.
Figure 6B:
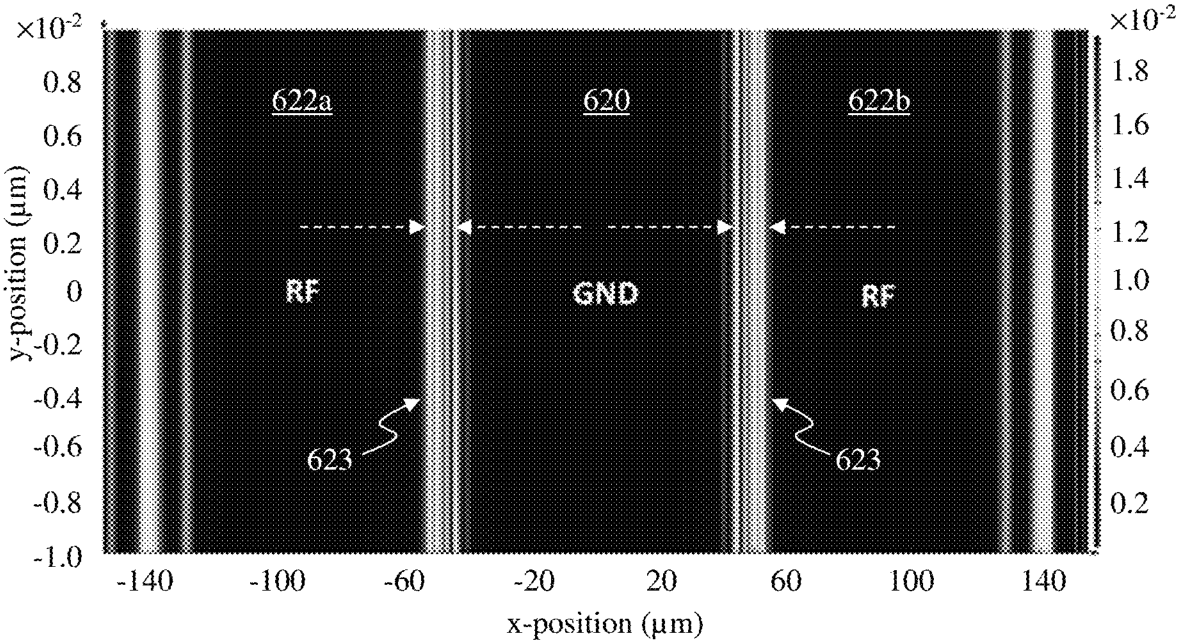

FIGS. 6A and 6B show results for energy efficiency distribution on the ion trap of various embodiments, across the x-axis, and in the xy plane respectively, illustrating the distribution of the electric field energy from the electromagnetic wave (light) emitted from the trapped ion. The figures show the localized efficiency on the surface of the designed ion trap when a photon-emitting ion is trapped ~76 μm on top of the ion trap. In FIG. 6B, the dashed arrows are pointing in the directions of increasing energy. From the figures, it may be observed that the energy efficiency in the gaps 623 (corresponding to where the peaks are in FIG. 6A) between the electrodes (GND electrode 620 and RF electrodes 622*a*, 622*b*) is much higher than the surface of the electrodes 620, 622*a*, 622*b*. As the gaps 623 between the metallic electrodes 620, 622*a*, 622*b* exposes the underlying $SiO_2$ layer, which may be transparent to 405-1092 nm light, a significant number of photons emitted from the trapped ion may reach the gaps 623 between the electrodes 620, 622*a*, 622*b*. Therefore, positioning the photon detectors at the inter-electrode gaps 623 may effectively detect the photons emitted from the trapped ion.

FIGS. 7A to 7F show, as cross-sectional views, various processing stages of a fabrication process for the photonics-integrated ion trap 700 of various embodiments.

Figure 7A:
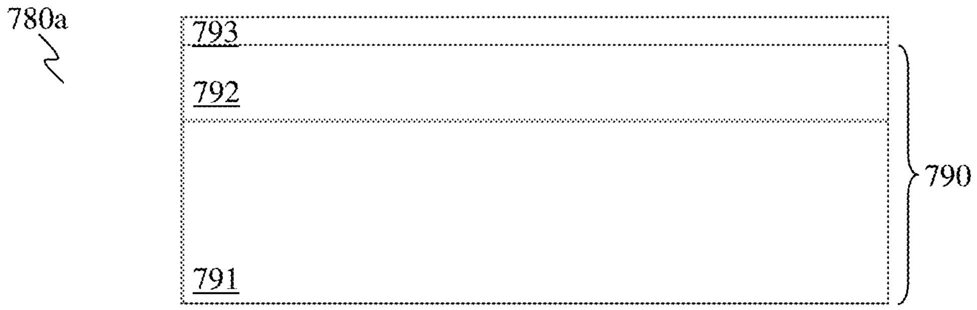
FIGS. 7A to 7F show, as cross-sectional views, various processing stages of a fabrication process for the photonics-integrated ion trap of various embodiments.

Referring to FIG. 7A, the fabrication process begins with a 100 μm thick silicon wafer or layer 791. A 3 μm $SiO_2$ layer 792 and a 0.3 μm $Si_3N_4$ layer 793 may then be deposited sequentially on the silicon layer 791, where the $SiO_2$ layer 792 and the $Si_3N_4$ layer 793 may act as the buried oxide (BOX) and the device layer, respectively. The silicon layer 791 and the $SiO_2$ layer 792 may define a support structure or a substrate (or substrate arrangement) 790. The structure 780*a* may be obtained.

Figure 7B:
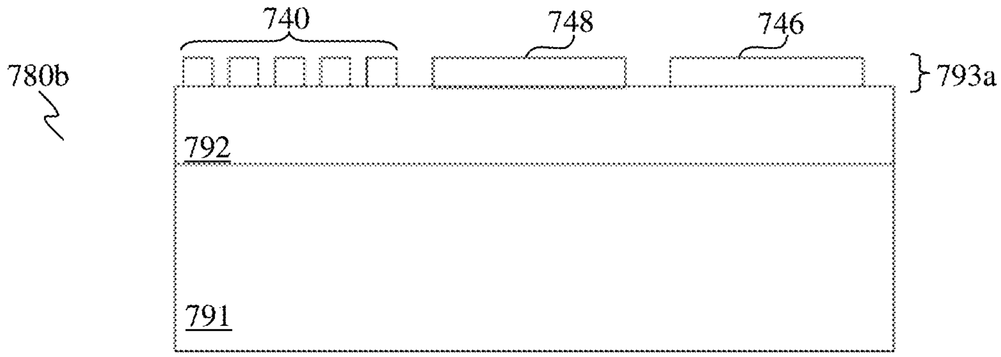

Referring to FIG. 7B, photolithography may then be performed on the $Si_3N_4$ surface or layer 793 to eventually form a $Si_3N_4$-based photonics layer 793*a*. The photolithography process includes patterning the optical output couplers (or grating couplers) 740, the waveguides (including coupling waveguides and input waveguides) 746, and the ring resonator structures 748. After that, an etch-through of the 0.3 μm $Si_3N_4$ layer 793 may be performed by a dry etching technique to form the above-mentioned photonics structures 740, 746, 748. The structure 780*b*, with a $Si_3N_4$-based photonics layer 793*a*, may be obtained.

Figure 7C:
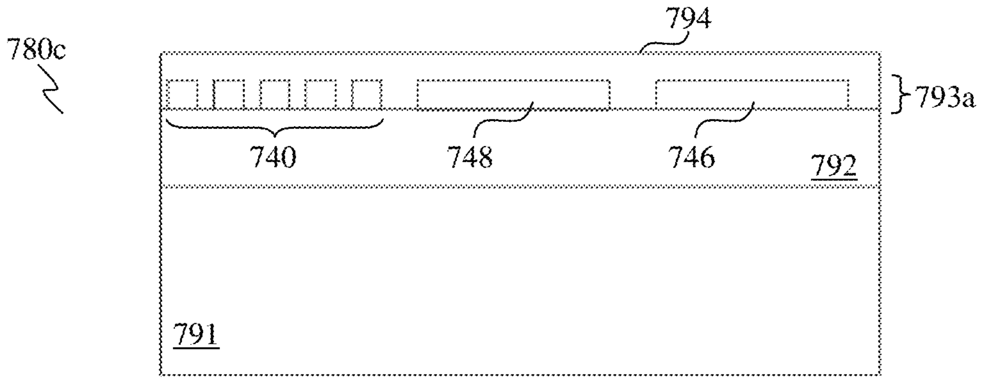

Referring to FIG. 7C, a 1.5 μm of $SiO_2$ layer 794 may then be deposited on or over the $Si_3N_4$-based photonics structures 740, 746, 748, followed by a chemical mechanical polishing (CMP) process to flatten the surface of the $SiO_2$ layer 794. The structure 780*c* may be obtained.

Figure 7D:
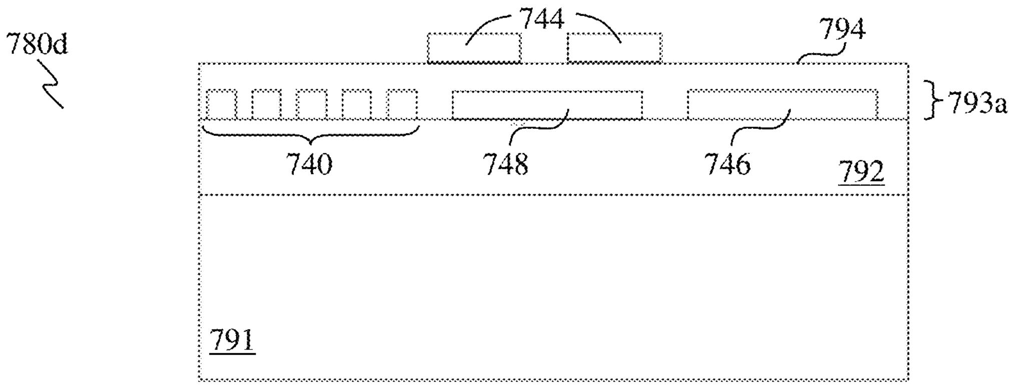

Deposition and fabrication of photon detectors (APD/SPAD) may then be carried out. Referring to FIG. 7D, photon detectors (SPAD/APD) 744 may be constructed on the surface of the $SiO_2$ layer 794, where the detectors 744 are positioned so as to be eventually located in between the gaps of the electrodes that are to be subsequently formed in order to enable exposure of the active regions of the detectors 744 to the possible photon emission from a trapped ion. The structure 780*d* may be obtained.

Figure 7E:
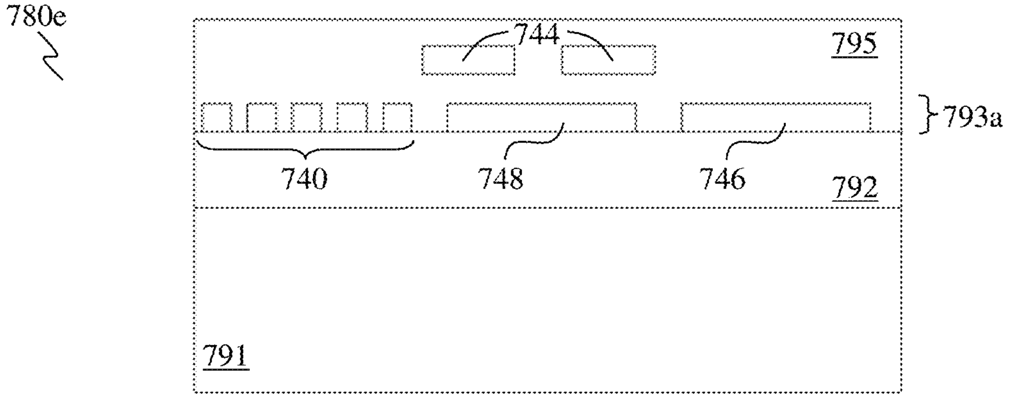

Another 1.5 μm of $SiO_2$ layer may then be deposited on the photon detectors 744 and the $SiO_2$ layer 794, followed by a CMP treatment to flatten the $SiO_2$ surface. Accordingly, a top oxide layer 795 of 3 μm may be formed in the structure 780*e* that may be obtained as shown in FIG. 7E.

Figure 7F:
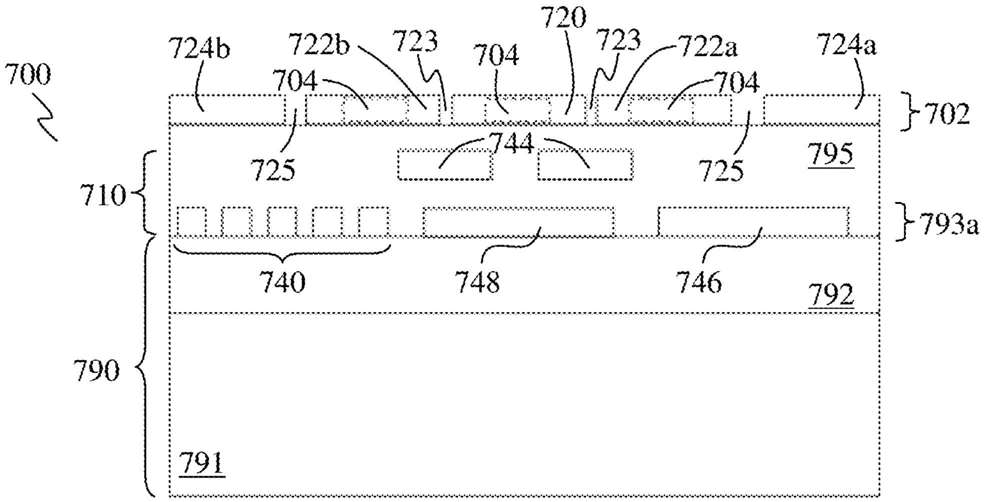

Ion trap electrodes may then be formed on the insulating $SiO_2$ layer 795. Referring to FIG. 7F, electrode material may first be deposited on the $SiO_2$ layer 795 using electroplating techniques to form a GND electrode 720, RF electrodes 722*a*, 722*b*, and DC electrodes 724*a*, 724*b*, with inter-electrode gaps 723 between the GND electrode 720 and the RF electrodes 722*a*, 722*b*, and inter-electrode gaps 725 between the RF electrodes 722*a*, 722*b* and the DC electrodes 724*a*, 724*b*. Opening windows 704 may be formed in the GND electrode 720 and the RF electrodes 722*a*, 722*b*. Accordingly, the device 700 may be obtained. The device 700 includes an electrode arrangement 702 having the GND electrode 720, the RF electrodes 722*a*, 722*b*, and the DC electrodes 724*a*, 724*b*. The device 700 further includes an optical arrangement 710 having the optical output couplers 740, the waveguides 746, the ring resonator devices 748, and the photon detectors 744. Opening windows 704 are defined in or through the GND electrode 720 and the RF electrodes 722*a*, 722*b* for optical addressing of ion(s) via the grating couplers 740. As may be seen in FIG. 7F, the inter-electrode gaps 723 are positioned right on top of or over the photon detectors 744 to expose the photon detectors 744 positioned underneath. The opening windows 704, including any associated trenches, may be formed as described herein above.

Figure 8:
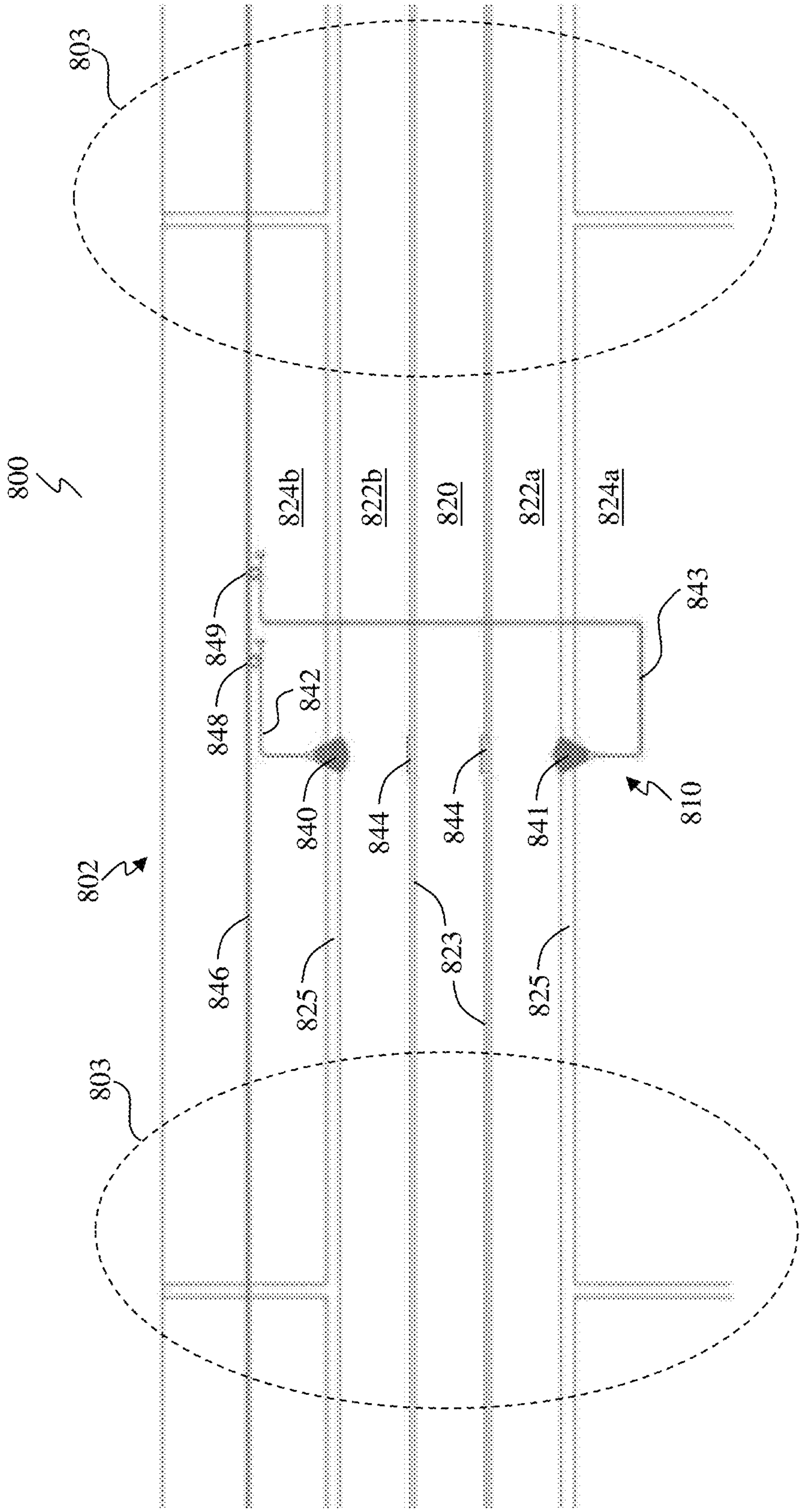
FIG. 8 shows a schematic plan view of a device of various embodiments.

FIG. 8 shows a schematic plan view of a device 800 of various embodiments. The device 800 includes an electrode arrangement 802 having a plurality of (ion trap) electrodes (represented by dashed ovals 803) including a GND electrode 820, RF electrodes 822*a*, 822*b*, and DC electrodes 824*a*, 824*b*. The GND electrode 820 and the RF electrodes 822*a*, 822*b* are spaced apart from each other by gaps 823, while the RF electrodes 822*a*, 822*b* and the DC electrodes 824*a*, 824*b* are spaced apart from each other by gaps 825.

The device 800 further includes an optical arrangement 810 arranged beneath the electrode arrangement 802, having optical output couplers 840, 841, coupling waveguides 842, 843, ring resonator devices 848, 849, and an input waveguide 846. The optical output couplers 840, 841, or at least part thereof, may be arranged optically exposed through the gaps 825. The optical arrangement 810 may further include photon detectors 844, or at least part thereof, that may be arranged optically exposed through the gaps 823. As compared to, for example, the devices 200, 300 shown in FIGS. 2A and 3C, no opening windows are defined in the electrode arrangement 802 of the device 800. As described, the grating couplers 840, 841 are instead placed at the electrode gaps 825.

As described herein, various embodiments may provide a photonics circuit integrated with an on-chip ion trap, for example, for quantum computing application(s). The photonics circuit may include the following designs: (i) on-chip multi-layer wavelength filtering using ring resonator structures, and/or (ii) positioning of photon detectors at the gaps between the ion trap electrodes for photon detection.

For design (i), ring resonator has been demonstrated to be able to selectively filter various wavelengths to respective waveguides/grating couplers for optical addressing.

For design (ii), photon detectors (e.g., APD or SPAD) may be designed to be placed between the gaps of ion trap electrodes to detect photons emitted from the trapped ion(s).

The number of ring resonators employed in the photonics circuit may be two or more, and may be scaled up to accommodate multiple ions. The shape of each ring resonator may be circle or oval, with various possible radii.

In various embodiments, at least one of the size, shape, position, or number of grating couplers may be varied.

The standalone photonics circuit of various embodiments may be integrated with an ion trap (electrode) arrangement without opening windows (e.g., see FIG. 8), or may be integrated with an ion trap (electrode) arrangement with opening windows (coinciding or aligned with grating couplers) (e.g., see FIGS. 2A and 3C).

In various embodiments, at least one of the size, shape, materials, or number of photon detectors may be varied. It should be appreciated that the placement of the photon detector(s) may not be limited to the gaps between the GND and RF electrodes. Any possible gaps between the DC, RF, and GND electrodes may accommodate any form of photon detectors.

For the device of various embodiments for trapping an ion, the thickness of at least one of the different layers or elements (e.g., Si, $Si_3N_4$, $SiO_2$, and ion trap electrode layers) may be varied. The materials of the electrode layers may be any form of metallic electrodes.

Alternative wavelength filters may be employed, for example, Mach-Zehnder Interferometer (MZI). However, as a trapped ion quantum computing system may require 4 to 5 different wavelengths for operation, and as MZIs may only have two ports, i.e., one inlet and one outlet, such configuration of MZIs may limit the integrability of multiple wavelength filters. So, MZIs may be not be the preferred option.

The devices of various embodiments can be easily recognisable via visual inspection due to the physical appearance involving ring-shaped resonator and waveguides connected to grating couplers, and the grating couplers being located below window openings, as well as photon detectors being located between electrode gaps.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A device for controlling an ion, comprising:

an electrode arrangement configured to generate an electric field to trap the ion, wherein a plurality of openings are defined in the electrode arrangement; and an optical arrangement configured to transmit a plurality of output optical signals of different wavelengths to the trapped ion to control the trapped ion, wherein the optical arrangement comprises a plurality of wavelength filters configured to receive at least one input optical signal, wherein, for each wavelength filter of the plurality of wavelength filters, the wavelength filter is configured to filter the at least one input optical signal to generate a respective output optical signal of the plurality of output optical signals, and wherein the optical arrangement is configured to transmit the respective output optical signal to the trapped ion through a respective opening of the plurality of openings, the respective output optical signal being defined by a respective wavelength of the different wavelengths.

2. The device as claimed in claim 1, wherein the wavelength filter comprises a ring resonator device.

3. The device as claimed in claim 1, wherein the optical arrangement further comprises at least one photon detector configured to detect one or more photons emitted from the trapped ion in response to the trapped ion receiving the respective output optical signal, the at least one photon detector being arranged optically exposed through an aperture defined in the electrode arrangement.

4. The device as claimed in claim 1, wherein the electrode arrangement comprises:

a ground electrode configured to be connected to ground;

a pair of first electrodes configured to generate a radio frequency field; and at least one pair of second electrodes configured to generate a direct current field, wherein the radio frequency field and the direct current field define the electric field.

5. The device as claimed in claim 4, wherein the plurality of openings are defined in at least one of the ground electrode or the pair of first electrodes.

6. The device as claimed in claim 4 or 5, wherein the ground electrode, the pair of first electrodes and the at least one pair of second electrodes are spaced apart from each other by a plurality of gaps, and wherein the plurality of openings are defined by the plurality of gaps.

7. The device as claimed in claim 1, wherein the optical arrangement further comprises a plurality of optical output couplers, wherein, for each optical output coupler of the plurality of optical output couplers, the optical output coupler is optically coupled to a respective wavelength filter of the plurality of wavelength filters to transmit the respective output optical signal to the trapped ion through the respective opening.

8. The device as claimed in claim 7, wherein the plurality of optical output couplers comprise:

a first pair of optical output couplers arranged along a first axis; and a second pair of optical output couplers arranged along a second axis.

9. A method for forming a device for controlling an ion, the method comprising:

forming an electrode arrangement configured to generate an electric field to trap the ion, wherein a plurality of openings are defined in the electrode arrangement; and forming an optical arrangement configured to transmit a plurality of output optical signals of different wavelengths to the trapped ion to control the trapped ion, wherein forming the optical arrangement comprises forming a plurality of wavelength filters configured to receive at least one input optical signal, wherein, for each wavelength filter of the plurality of wavelength filters, the wavelength filter is configured to filter the at least one input optical signal to generate a respective output optical signal of the plurality of output optical signals, and wherein the optical arrangement is configured to transmit the respective output optical signal to the trapped ion through a respective opening of the plurality of openings, the respective output optical signal being defined by a respective wavelength of the different wavelengths.

10. The method as claimed in claim 9, wherein the wavelength filter comprises a ring resonator device.

11. The method as claimed in claim 9, wherein forming the optical arrangement further comprises forming at least one photon detector configured to detect one or more photons emitted from the trapped ion in response to the trapped ion receiving the respective output optical signal, the at least one photon detector being arranged optically exposed through an aperture defined in the electrode arrangement.

12. The method as claimed in claim 9, wherein forming the electrode arrangement comprises:

forming a ground electrode configured to be connected to ground;

forming a pair of first electrodes configured to generate a radio frequency field; and forming at least one pair of second electrodes configured to generate a direct current field, wherein the radio frequency field and the direct current field define the electric field.

13. The method as claimed in claim 12, wherein the plurality of openings are defined in at least one of the ground electrode or the pair of first electrodes.

14. The method as claimed in claim 12, wherein the ground electrode, the pair of first electrodes and the at least one pair of second electrodes are spaced apart from each other by a plurality of gaps, and wherein the plurality of openings are defined by the plurality of gaps.

15. The method as claimed in claim 9, wherein forming the optical arrangement further comprises forming a plurality of optical output couplers, wherein, for each optical output coupler of the plurality of optical output couplers, the optical output coupler is optically coupled to a respective wavelength filter of the plurality of wavelength filters to transmit the respective output optical signal to the trapped ion through the respective opening.

16. The device as claimed in claim 15, wherein forming the plurality of optical output couplers comprises:

forming a first pair of optical output couplers along a first axis; and forming a second pair of optical output couplers along a second axis.

17. A method for controlling a device for controlling an ion, the method comprising:

generating, by means of an electrode arrangement of the device, an electric field to trap the ion;

filtering, by means of an optical arrangement of the device, at least one input optical signal to generate a plurality of output optical signals of different wavelengths; and transmitting, by means of the optical arrangement, the plurality of output optical signals to the trapped ion to control the trapped ion, wherein a respective output optical signal of the plurality of output optical signals having a respective wavelength of the different wavelengths is transmitted to the trapped ion through a respective opening of a plurality of openings defined in the electrode arrangement.

* * * * *